US009288746B2

(12) United States Patent
Gholmieh et al.

(10) Patent No.: US 9,288,746 B2
(45) Date of Patent: Mar. 15, 2016

(54) DETERMINATION OF AVAILABLE SERVICES IN A BROADCAST NETWORK

(71) Applicant: QUALCOMM Incorporated, San Diego, CA (US)

(72) Inventors: Ralph A. Gholmieh, San Diego, CA (US); Nagaraju Naik, San Diego, CA (US); Jun Wang, San Diego, CA (US); Kuo-Chun Lee, San Diego, CA (US); Carlos M. D. Pazos, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 150 days.

(21) Appl. No.: 13/802,416

(22) Filed: Mar. 13, 2013

(65) Prior Publication Data
US 2014/0080475 A1 Mar. 20, 2014

Related U.S. Application Data

(60) Provisional application No. 61/703,769, filed on Sep. 20, 2012.

(51) Int. Cl.
*H04W 48/16* (2009.01)
*H04W 36/36* (2009.01)
*H04W 36/30* (2009.01)
*H04W 4/06* (2009.01)
*H04W 48/20* (2009.01)

(52) U.S. Cl.
CPC .............. *H04W 48/16* (2013.01); *H04W 4/06* (2013.01); *H04W 36/30* (2013.01); *H04W 36/36* (2013.01); *H04W 48/20* (2013.01)

(58) Field of Classification Search
CPC ..... H04W 48/16; H04W 48/20; H04W 36/36; H04W 36/30; H04W 4/06
USPC ................. 455/443, 436, 449, 444, 422.1
See application file for complete search history.

(56) References Cited

U.S. PATENT DOCUMENTS

| 5,442,806 | A | * | 8/1995 | Barber et al. .............. 455/435.2 |
| 5,613,213 | A | * | 3/1997 | Naddell et al. ............. 455/435.2 |
| 2007/0064652 | A1 | * | 3/2007 | Xu et al. ..................... 370/331 |
| 2008/0311926 | A1 | * | 12/2008 | Fischer ............... H04W 72/005 455/452.1 |

(Continued)

FOREIGN PATENT DOCUMENTS

| EP | 1973356 A2 | 9/2008 |
| KR | 20030075530 A | 9/2003 |
| WO | WO-2008153302 A2 | 12/2008 |

OTHER PUBLICATIONS

3GPP TS 36.101 V11.0.0, 3rd Generation Partnership Project; Technical Specification Group Radio Access Network; Evolved Universal Terrestrial Radio Access (E-UTRA); User Equipment (UE) radio transmission and reception (Release 11), Mar. 2012.

(Continued)

*Primary Examiner* — Khai M Nguyen

(57) ABSTRACT

The various embodiments enable a mobile device to determine the available services in a broadcast network based on an augmented coverage configuration file. In the various embodiments, the augmented coverage configuration file correlates the services for overlapping cells on different frequency carriers enabling the mobile device to determine the available services without having to scan additional frequency carriers.

27 Claims, 21 Drawing Sheets

(56) References Cited

U.S. PATENT DOCUMENTS

| | | |
|---|---|---|
| 2009/0209267 A1 | 8/2009 | Jagetiya |
| 2009/0264064 A1* | 10/2009 | Hyun et al. .................. 455/3.06 |
| 2010/0195643 A1 | 8/2010 | Kodali et al. |
| 2010/0304782 A1* | 12/2010 | Chang ................... H04W 8/183 455/552.1 |
| 2011/0047288 A1 | 2/2011 | Sakano |
| 2011/0306353 A1 | 12/2011 | Kim et al. |
| 2012/0058742 A1* | 3/2012 | Razoumov ............ H04W 48/18 455/406 |
| 2014/0003301 A1* | 1/2014 | Madan ................ H04W 72/042 370/280 |

OTHER PUBLICATIONS

International Search Report and Written Opinion—PCT/US2013/058468, International Search Authority—European Patent Office, Jan. 28, 2014.

* cited by examiner

DETERMINATION OF AVAILABLE SERVICES IN A BROADCAST NETWORK

RELATED APPLICATIONS

This application claims the benefit of priority to U.S. Provisional Patent Application No. 61/703,769 entitled "Determination of Available Services in a Broadcast Network" filed Sep. 20, 2012, the entire contents of which are hereby incorporated by reference.

BACKGROUND

In cellular networks, cells corresponding to different frequency bands and/or carriers may cover the same geographic area. In current cellular networks, when a geographic area is covered by more than one cell, a mobile device may only detect available broadcast services, such as audio or video streaming, for one cell, and the mobile device may not detect the availability of services on cells covering other frequencies. This may result in the mobile device failing to present a full list of available services for a geographic area.

SUMMARY

The systems, methods, and devices of the various embodiments enable a mobile device to determine the available services in a broadcast network based on an augmented coverage configuration file. In the various embodiments, the augmented coverage configuration file correlates the services for overlapping cells with different frequency carriers enabling the mobile device to determine the available services without having to scan additional frequency carriers.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
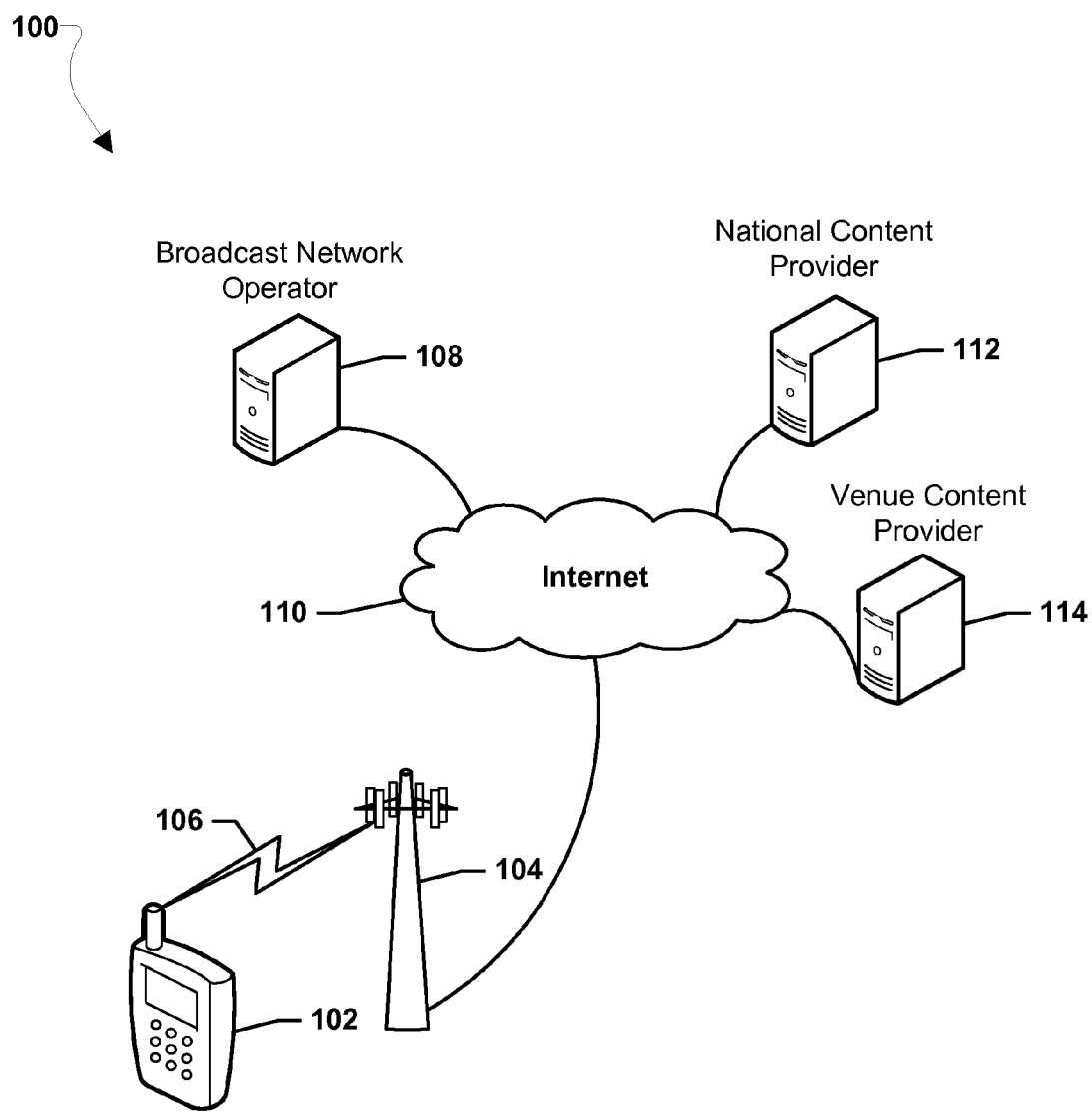
FIG. 1 is a communication system block diagram of a network suitable for use with the various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

As used herein, the terms "mobile device," "user equipment" (UE), and "receiver device" are used interchangeably herein to refer to any one or all of cellular telephones, smart phones, personal or mobile multi-media players, personal data assistants (PDA's), laptop computers, tablet computers, smart books, palm-top computers, wireless electronic mail receivers, multimedia Internet enabled cellular telephones, wireless gaming controllers, and similar personal electronic devices which include a programmable processor and memory and circuitry for receiving broadcast services in a cellular network.

The terms "frequency band" and "frequency carrier" are used interchangeably herein to refer to the frequency or frequencies of the carrier signals on which cellular telephone networks transmit services to mobile devices operating in the cellular network. In some technologies the carrier signals may be transmitted at frequencies that fall within a single contiguous frequency band. In other technologies, however, carrier signals may be transmitted at a number of frequencies that are not within a single contiguous frequency band. For this reason, the general term "frequency carrier" refers to carrier signals encompass both carrier signals within a contiguous frequency band and carrier signals at a plurality of frequencies not in a contiguous frequency band.

The various embodiments enable a mobile device to determine the available services in a broadcast network based on an augmented coverage configuration file. In the various embodiments, the augmented coverage configuration file correlates the services for overlapping cells in a plurality of different frequency bands and/or carriers enabling the mobile device to determine the available services without having to scan additional frequency bands and/or carriers.

Cellular telephone networks may provide multiple unicast and broadcast services to mobile devices operating in the cellular network. In various cellular networks, services may be broadcast over different radio frequency bands and/or carriers, such as radio frequency bands 4 and 13. The mobile device may scan control channels broadcast in the various radio frequency bands and/or carriers, such as mobile control channels (MCCHs), to determine the list of broadcast services available to the mobile device. For example, a mobile device may enter a cell in the cellular network operating in a first frequency band and/or carrier, such as a band 13 cell. The mobile device may scan for the MCCH in the first frequency band and/or carrier for the cell the mobile device is currently in to determine the list of broadcast Temporary Mobile Group Identifiers (TMGIs), and by comparing the TMGIs to the received User Service Description (USD) may determine the list of broadcast services available on the current carrier in the current cell. However, the mobile device may not detect the availability of broadcast services on other frequency cells, such as frequency band 4 cells, that cover the same geographic region because only the services for the first frequency band and/or carrier cell were identified using the MCCH. This may result in the mobile device failing to present a full list of available services for a geographic area. While the mobile device could scan all frequencies to determine services available in/on a plurality of various frequency bands and/or carriers, scanning all frequencies may be costly in terms of power consumption and may impact unicast behavior of the mobile device, for example resulting in missed paging announcements. Additionally, in a connected mode, accessible services may be those of the current frequency, and once a TMGI is active, accessible services may be those of the current frequency. Also, at any time in the connected mode, the network may switch the mobile device from a frequency where an eMBMS service is being received to another frequency where the eMBMS service may not be provided, which may impact the reporting of available services.

The various embodiments provide an augmented coverage configuration file to the mobile devices which enables the mobile devices to determine the availability of additional services for a geographic area and which may enable the mobile device to present an increased list of available services. In an embodiment, the augmented coverage configuration file may be provided by the cellular network. In the various embodiments, the augmented coverage configuration file may map cell identification information, such as cell global identifications (IDs), physical cell IDs, etc., to service information, such as available services and/or service area identifications. In an embodiment, the augmented coverage configuration file may only include information related to cells in which the list of broadcast TMGI's may not be sufficient for determining all of the available services for users in the geographic area of the cell. As an example, the list of broadcast TMGI's may not be sufficient for determining all available services in geographic areas served by overlapping cells of different frequency bands and/or carriers, such as overlapping band 13 cells and band 4 cells. In an embodiment, the augmented coverage configuration file may also associate a range of cell identifications with services and/or service areas.

In an embodiment, the augmented coverage configuration files may be delivered to the mobile device via an evolved Multimedia Broadcast Multicast Services (eMBMS) user service of the file delivery type. The delivery service for the augmented coverage configuration file may be described via a USD channel and may be associated with a service class specific to the eMBMS middleware resident on the mobile device. The USD channel may include schedule fragments with session and file schedule information that may describe the broadcast transmissions of the augmented coverage configuration file. In an embodiment, the schedule fragment may describe when the current version of the augmented coverage configuration file may be sent. In an embodiment, the transmission may be periodic, such as multiple transmissions on the same day or over multiple days, and may be more frequent when the augmented coverage configuration file changes and/or less frequently when there is no change. For example, the augmented coverage configuration file may be sent once a day normally, but may be sent four times a day preceding a venue event. The augmented coverage configuration file may be updated when cells, such as band 13 or band 4 cells, are added, are removed, increase, decrease, or are changed, when new venues are created, and/or when new boosted unicast coverage areas are created. In an embodiment, the augmented coverage configuration files may be configured with easily recognizable file names, such as config.xml for the parameter configuration file, and coverage xml for the augmented coverage configuration file. In an embodiment, updates to the augmented coverage configuration file may be signaled by sending the new file content under the same file name but with a new message digest algorithm (e.g., a new MD5). In an embodiment, mobile devices may be factory installed with a version of the augmented coverage configuration file. In another embodiment, the mobile devices may not include pre-installed augmented coverage configuration files.

In an embodiment, cellular networks may include cells operating on different frequency bands and/or carriers, such as band 13 cells and band 4 cells, and the different frequency band and/or carrier cells may overlap to provide coverage to the same geographic area. The different frequency bands and/or carriers may provide different services. For example, a first frequency band and/or carrier of cells, such as band 13 cells, may provide national coverage and may provide national broadcast content and unicast services, while the second frequency band and/or carrier of cells, such as band 4 cells, may provide in-venue broadcast content, duplicated national broadcast content, and/or boosted unicast coverage. As used herein, national broadcast content may be content, such as audio, video, text, etc., broadcast nationally throughout a large portion, such as an entire country or region, of a cellular network. As used herein, in-venue broadcast content may be content, such as audio, video, text, etc., broadcast locally for a specific venue, such as a single building, sports stadium, campus, etc.

In an embodiment, the mobile device may receive the current cell identification of the cell the mobile device is currently located in. As an example, the current cell identification may be received by monitoring the cell global ID of the current cell. The mobile device may receive the augmented coverage configuration file which may include information mapping cell IDs, such as cell global IDs and/or physical cell IDs, to their corresponding assigned service areas. The cellular network may announce the services corresponding to service areas in the USD which may be received by the user device. The mobile device may determine one or more available services for the current cell based on the augmented coverage configuration file by determining the service area corresponding to the current cell ID listed in the augmented coverage configuration file and mapping the determined service area to the services listed in the USD. As an example, the mobile device may be operating in a band 13 cell receiving national broadcast content of a nationally televised football game. The mobile device may have received the cell global ID of the band 13 cell when the mobile device originally entered the band 13 cell. Additionally, the mobile device may receive a USD listing the services available for service areas across a plurality of various frequency bands and/or carriers. The mobile device may enter a venue within the band 13 cell, such as the football stadium where the football game is occurring, and in addition to the band 13 cell the venue may be covered by a band 4 cell broadcasting both the national broadcast content and in-venue broadcast content, such as individual camera feeds of cameras in the football stadium. The mobile device may determine the band 13 cell is listed in the augmented coverage configuration file, and may identify the service area ID corresponding to the band 13 cell from the augmented coverage configuration file. The mobile device may compare the service area ID to the USD to identify all the band 13 and band 4 services available in the service area, and may flag services available in both the band 13 cell and the band 4 cell as available. In this manner, the mobile device may identify band 4 services, such as in-venue broadcast content, as available without determining from the MCCH of the band 4 cell which band 4 TMGIs are available.

Various examples of different frequency bands and/or carriers for cellular networks are discussed herein, specifically band 13 and band 4 frequencies. The discussions of band 13 and band 4 frequencies are provided merely as examples to better illustrate the aspects of the various embodiments, and are not intended to limit the various embodiments in any way. Other frequency bands, such as other frequency bands with multiple frequencies per band, may be used with the various embodiments, and the other frequency bands may be substituted in the various examples without departing from the spirit or scope of the invention. Additionally, various examples using two different frequency bands are discussed herein; however, the discussions of two different frequency bands are provided merely as examples to better illustrate the various aspects, and are not intended to limit the scope of the claims to just two frequency bands. Additional different numbers of frequency bands, such as three, four, five, etc. frequency bands may be used with the various aspects, and different numbers of different frequency bands may be substituted in the various examples and in the claims. Additionally, while various example embodiments using two different frequency bands are discussed herein, the discussions of two different frequency bands are provided merely as examples, and a single frequency band with two or more different carriers may be used with the various embodiments, and two or more different carriers may be substituted in the various examples and in the claims.

FIG. 1 illustrates a cellular network system 100 suitable for use with the various embodiments. The cellular network system 100 may include multiple devices, such as a mobile device 102, one or more cellular towers or base stations 104, and servers 108, 112, and 114 connected to the Internet 110. The mobile device 102 may exchange data via one or more cellular connections 106, including CDMA, TDMA, GSM, PCS, 3G, 4G, LTE, or any other type connection, with the cellular tower or base station 104. The cellular tower or base station 104 may be in communication with a router which may connect to the Internet 110. In this manner, via the connections to the cellular tower or base station 104, and/or Internet 110, data may be exchanged between the mobile device 102 and the server(s) 108, 112, and 114. In an embodiment, server 108 may be a broadcast network operator server controlling the operations of the cellular network including the mobile device 102 and the cellular tower or base station 104 and the provisioning of content to the mobile device 102 from the content servers 112 and 114. In an embodiment, server 112 may be a national content provider server providing national broadcast content and server 114 may be a venue content provider server providing in-venue broadcast content.

Figure 2:
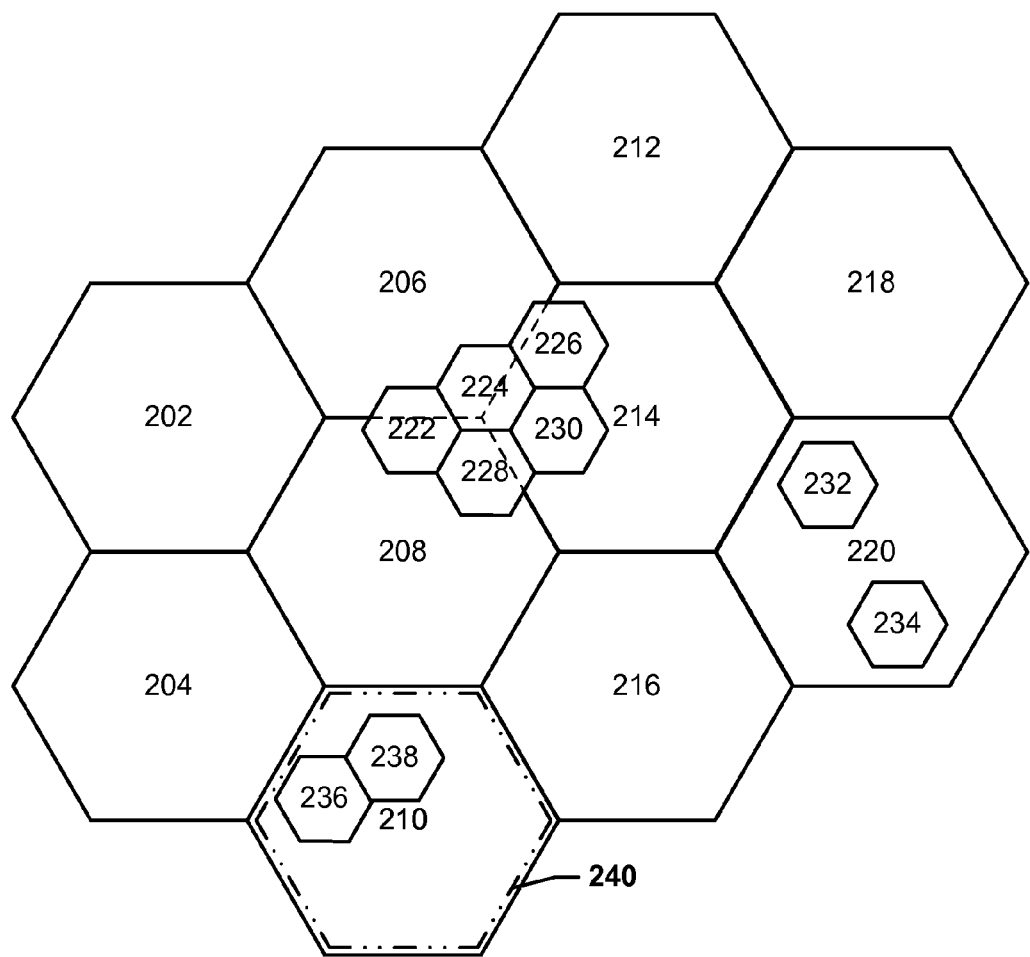
FIG. 2 is a block diagram illustrating cells in a cellular network suitable for use with the various embodiments.

FIG. 2 illustrates the relationship between cells in a cellular network suitable for use with the various embodiments. The cells 202, 204, 206, 208, 210, 212, 214, 216, 218, and 220 may be associated with a first frequency band and/or carrier, such as band 13, and the cells 222, 224, 226, 228, 230, 232, 234, 236, and 238 may be associated with a second frequency band and/or carrier, such as band 4. The cells 202, 204, 206, 208, 210, 212, 214, 216, 218, and 220 may be of a larger size than the cells 222, 224, 226, 228, 230, 232, 234, 236, and 238. Each cell 202, 204, 206, 208, 210, 212, 214, 216, 218, 220 222, 224, 226, 228, 230, 232, 234, 236, and 238 may be identified by a cell global ID and a physical cell ID. In an embodiment, the cell global ID may be unique throughout the cellular network, and the physical cell ID may be locally unique among cells in a local area smaller than the entire cellular network. Neighboring cells (i.e., neighbor cells) may be the cells which are adjacent to a given cell in the same frequency band and/or carrier. For example, the neighboring cells to cell 208 in/on the first frequency band and/or carrier may be cells 202, 204, 210, 216, 214, and 206. As another example, the neighboring cells to cell 224 in/on the second frequency band and/or carrier may be cells 222, 228, 230, and 226. In an embodiment, the physical cell ID of neighboring cells may be obtained by a mobile device scanning for the physical cell IDs of neighboring cells while in unicast idle mode after every paging channel monitoring event. As an example, the scanning in this manner may be done when the cell signal is weak. In another embodiment, when the mobile device may be in the unicast connected mode, signals from the cellular network operator may tell the mobile device to schedule inter-frequency measurements to scan for the physical cell IDs of neighboring cells. Overlapping cells may provide coverage to the same geographic areas. For example, cell 208 and cells 222, 224, and 228 overlap; cell 206 and cells 222, 224, and 226 overlap; cell 214 and cells 224, 226, 228, and 230 overlap; cells 220 and 232 overlap; cells 220 and 234 overlap; and cell 210 and 236 and 238 overlap. In an embodiment, cells 202, 204, 206, 208, 210, 212, 214, 216, 218, and 220 in/on the first frequency band and/or carrier, such as band 13, may all include the same services, for example unicast services and broadcast services of national broadcast content, while cells 222, 224, 226, 228, 230, 232, 236, and 238 in/on the second band and/or carrier, such as band 4, may include services for broadcasting in-venue broadcast content and duplicated national broadcast content, and cell 234 in/on the second band and/or carrier, such as band 4, may include only unicast services providing boosted unicast services to augment the unicast services provided by cell 220. In an embodiment, venues, such as a football stadium, may be covered by multiple cells in/on the first frequency band and/or carrier and multiple cells in/on the second frequency band and/or carrier. For example, a football stadium may be covered by first frequency band and/or carrier cells 206, 208, and 214, and second frequency band and/or carrier cells 222, 224, 226, 228, and 230. In another embodiment, venues, such as a football stadium, may be covered by a single cell in/on the first frequency band and/or carrier and multiple cells in/on the second frequency band and/or carrier. For example, a football stadium may be covered by first frequency band and/or carrier cell 210 and second frequency band and/or carrier cells 236 and 238. In an embodiment, the cells in a geographic area may be grouped together by the network operator into service areas, such as service area 240. The service area 240 may include both the first frequency band and/or carrier cell 210 and second frequency band and/or carrier cells 236 and 238 covering a geographic area. In an embodiment, the service area 240 may be assigned a service area ID. In an embodiment, a service area ID may include a listing of all cells identifiers, such as the cell global IDs and/or physical cell IDs of cells 236, 238, and 210 included in the service area 240. In an embodiment, a service area 240 may be an eMBMS service area and the service area ID may be the eMBMS service area's service area ID (SAI).

Figure 3A:
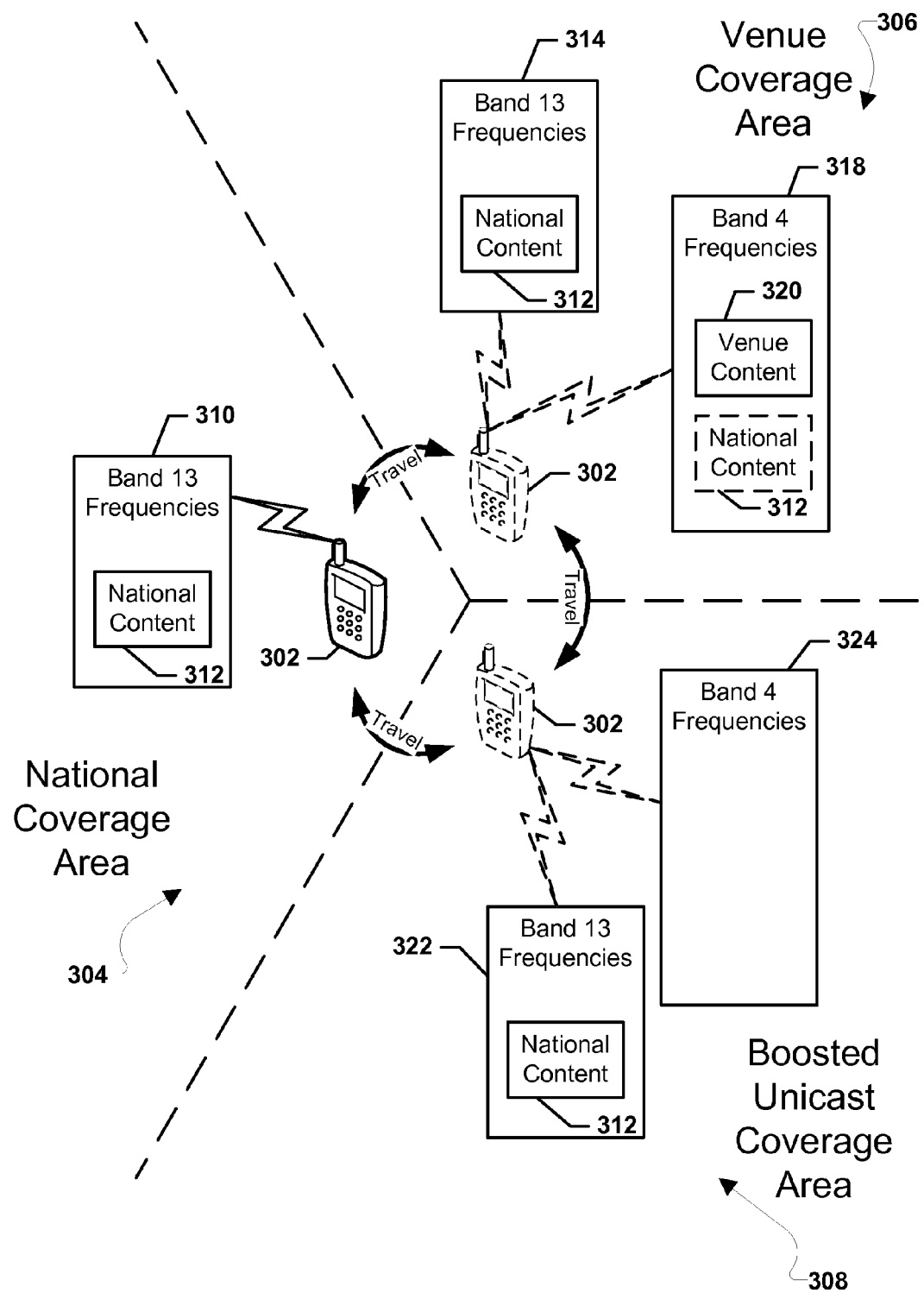
FIG. 3A is a block diagram illustrating an embodiment broadcast system suitable for use with the various embodiments.

FIG. 3A illustrates an embodiment broadcast system suitable for use with the various embodiments. FIG. 3A illustrates the potential relationship between a mobile device 302 and coverage areas 304, 306, and 308. In an embodiment, a national coverage area 304 may be a geographic area only covered by a single cell, such as single cell operating in the band 13 frequencies 310. In the national coverage area 304, both unicast and broadcast services may be available via the band 13 frequencies 310, and only the national broadcast content 312 may be being broadcast over the band 13 frequencies 310. The mobile device 302 operating in the national coverage area 304 may only have services from the band 13 frequencies 310 available to it. The mobile device 302 operating in the national coverage area 304 may be able to determine all available services in national coverage area 304 from an MCC for the band 13 frequencies 310 because no non-band 13 services may be available. In an embodiment, a venue coverage area 306 may be a geographic area associated with a specific venue, such as a football stadium, and may be covered by overlapping cells operating in a plurality of frequencies, such as one or more cells operating in band 13 frequencies 314 and one or more cells operating in band 4 frequencies 318. In this manner, when the mobile device 302 travels into the venue coverage area 306 the mobile device 302 may have services from the band 13 frequencies 314 and the band 4 frequencies 318 available to it. In the venue coverage area, both unicast and broadcast services may be available via the band 13 frequencies 314 and/or the band 4 frequencies 318. In the various embodiments, the same national broadcast content 312 broadcast in the national coverage area 304 may also be broadcast on the band 13 frequencies 314 in the venue coverage area 306. Venue broadcast content 320 may be broadcast on the band 4 frequencies 318 in the venue coverage area 306. Optionally, duplicate national broadcast content 312 may also be broadcast on the band 4 frequencies thereby enabling the mobile device to receive national broadcast content 312 via the band 13 frequencies 314 and/or the band 4 frequencies 318 in the venue coverage area 306. In the various embodiments, a boosted unicast coverage area 308 may be a geographic area covered by overlapping cells operating in a plurality of frequencies, such as one or more cells operating in band 13 frequencies 322 and one or more cells operating in band 4 frequencies 324. In the boosted unicast coverage area 308 the cells operating in the band 4 frequencies 324 may only provide unicast services, and may not provide broadcast services. In an embodiment, the same national broadcast content 312 broadcast in the national coverage area 304 may also be broadcast on the band 13 frequencies 322 in the boosted unicast coverage area 308.

In the various embodiments, an augmented coverage configuration file may enable the mobile device 302 to report all the available services in each coverage area 304, 306, and 308, as the mobile device 302 moves from one coverage area to the next. In an embodiment, when the mobile device 302 is in a national coverage area 304 and connected over unicast or receiving eMBMS broadcast via the band 13 frequencies, the mobile device 302 may travel to a venue coverage area 306. Because the mobile device 302 may be connected over unicast or receiving eMBMS broadcast, the mobile device may be effectively stuck or camped on band 13 frequencies, and may only detect services available from the band 13 frequencies 314 available in the venue coverage area 306, even though services over band 4 frequencies 318 are also available. For example, when the mobile device 302 is receiving eMBMS content via the band 13 frequencies 314 the mobile device 302 may give the highest priority to the band 13 frequencies 314 and may not scan for an available TMGI list from the band 4 frequencies 318 until the mobile device 302 stops receiving the eMBMS content. As another example, when the mobile device 302 is in unicast connected mode with band 13 frequencies 314, it may follow network directives for handoff and may not scan the band 4 frequencies 318. As a further example, when the mobile device 302 is in idle on both eMBMS and unicast it may follow network priorities for reselection and may end up on the band 13 frequencies 314, thereby missing the band 4 frequencies 318 as well. In the various embodiments, the augmented coverage configuration file may associate the services on the band 13 frequencies 314 in the venue coverage area 306 with the services on the band 4 frequencies 318 in the venue coverage area 306, and using the augmented coverage configuration file the mobile device 302 may determine the available services on the band 4 frequencies 318 without actually scanning the band 4 frequencies 318. In a similar manner, when the mobile device 302 travels to the boosted unicast coverage area 308 network priorities may force the mobile device 302 into unicast connected mode via the band 4 frequencies 324, and the mobile device 302 may not detect broadcast services available via band 13 frequencies 322. In the various embodiments, the augmented coverage configuration file may associate the services on the band 13 frequencies 322 with the band 4 frequencies 324 in the boosted unicast coverage area 308, and using the augmented coverage configuration file the mobile device 302 may determine available services on the band 13 frequencies 322 without actually scanning the band 13 frequencies 322.

Figure 3B:
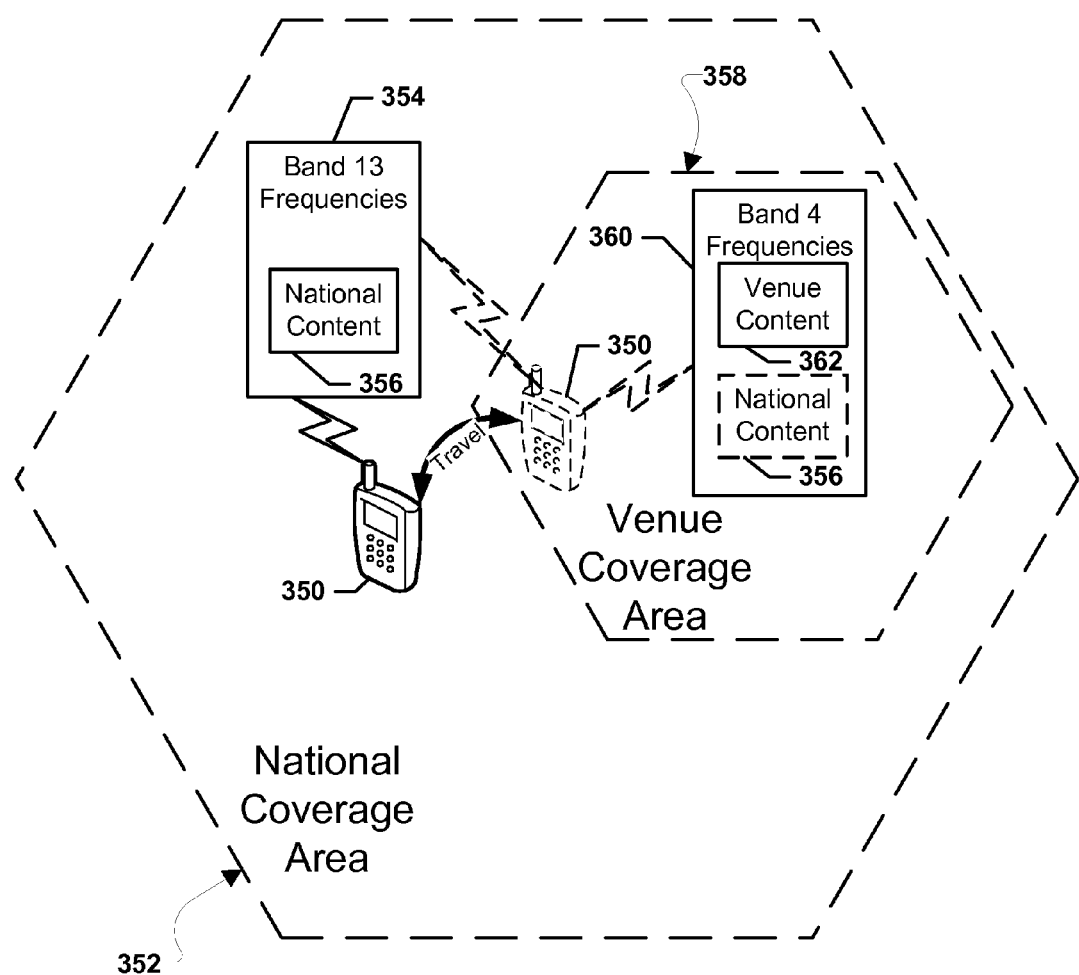
FIG. 3B is a block diagram illustrating another embodiment broadcast system suitable for use with the various embodiments.

FIG. 3B illustrates an embodiment broadcast system suitable for use with the various embodiments. FIG. 3B illustrates the potential relationship between a mobile device 350 and coverage areas 352 and 358. In the embodiment illustrated in FIG. 3B, a portion of coverage area 352 may overlap with a portion of coverage area 358. In the non-overlapping portion of coverage area 352 services from coverage area 358 may not be available. In an embodiment, a national coverage area 352 may be a geographic area only covered by a single cell, such as single cell operating in the band 13 frequencies 354. In the national coverage area 352, both unicast and broadcast services may be available via the band 13 frequencies 354, and only the national broadcast content 356 may be being broadcast over the band 13 frequencies 354. The mobile device 350 operating in the national coverage area 352 may only have services from the band 13 frequencies 354 available to it when the mobile device 350 is in a portion of the national coverage area 352 not overlapped by other coverage areas, such as venue coverage area 358. The mobile device 302 operating in a non-overlapped portion of the national coverage area 352 may be able to determine all available services in the non-overlapped portion national coverage area 352 from an MCC for the band 13 frequencies 354 because no non-band 13 services may be available. In an embodiment, a venue coverage area 358 may be a geographic area associated with a specific venue, such as a football stadium, and may be covered by its own frequency cells such as one or more cells operating in band 4 frequencies 360. The venue coverage area 358 may overlap with the national coverage area 352. In this manner, when the mobile device 350 travels into the venue coverage area 358 the mobile device 350 may have services from the band 13 frequencies 354 and the band 4 frequencies 360 available to it. In the venue coverage area, both unicast and broadcast services may be available via the band 13 frequencies 356 and/or the band 4 frequencies 360. Venue broadcast content 362 may be broadcast on the band 4 frequencies 360 in the venue coverage area 358. Optionally, duplicate national broadcast content 356 may also be broadcast on the band 4 frequencies thereby enabling the mobile device 350 to receive national broadcast content 356 via the band 13 frequencies 354 and/or the band 4 frequencies 360 in the venue coverage area 358.

In the various embodiments, an augmented coverage configuration file may enable the mobile device 350 to report all the available services in each coverage area 352 and 358, as the mobile device 350 moves from a location covered by one coverage area (i.e., a non-overlapped portion of a coverage area) to a location covered by more than one coverage area (i.e., an overlapping portion of coverage areas). In an embodiment, when the mobile device 350 is in an non-overlapped portion of a national coverage area 352 and connected over unicast or receiving eMBMS broadcast via the band 13 frequencies, the mobile device 350 may travel to into a portion of a venue coverage area 358 that overlaps the national coverage area 352. Because the mobile device 350 may be connected over unicast or receiving eMBMS broadcast, the mobile device may be effectively stuck or camped on band 13 frequencies, and may not detect services in other frequency bands available in the venue coverage area 358, even though services over band 4 frequencies 360 are also available. For example, when the mobile device 350 is receiving eMBMS content via the band 13 frequencies 354 the mobile device 350 may give the highest priority to the band 13 frequencies 356 and may not scan for an available TMGI list from the band 4 frequencies 360 until the mobile device 350 stops receiving the eMBMS content. As another example, when the mobile device 350 is in unicast connected mode with band 13 frequencies 356, it may follow network directives and may not scan the band 4 frequencies 360. As a further example, when the mobile device 350 is in idle on both eMBMS and unicast it may follow network priorities and may end up on the band 13 frequencies 354, thereby missing the band 4 frequencies 360 as well. In the various embodiments, the augmented coverage configuration file may associate the services on the band 13 frequencies 354 in the national coverage area 352 with the services on the band 4 frequencies 360 in the venue coverage area 358, and using the augmented coverage configuration file the mobile device 350 may determine the available services on the band 4 frequencies 360 without actually scanning the band 4 frequencies 360.

Figure 4:
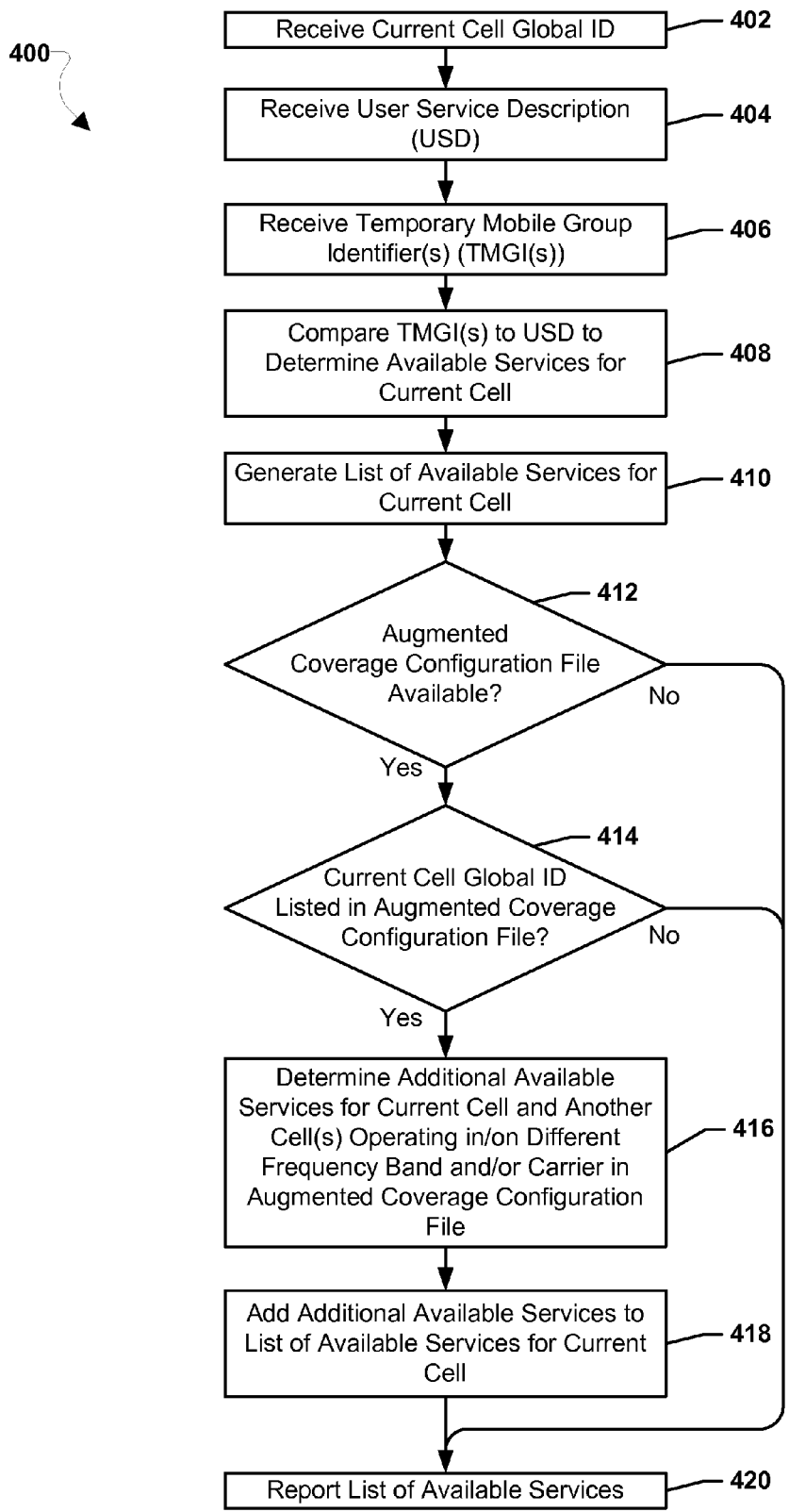
FIG. 4 is a process flow diagram illustrating an embodiment method for determining available services for a broadcast network.

FIG. 4 illustrates an embodiment method 400 for determining available services for a broadcast network using an augmented coverage configuration file correlating cell global IDs and available services. In an embodiment, the operations of method 400 may be performed by the processor of a mobile device. In block 402 the mobile device processor may receive the current cell global ID for the cell the mobile device is currently located in. In an embodiment, the current cell global ID may be received as part of the messages exchanged between the mobile device and the cellular network to establish service in the cell the mobile device is currently in. In block 404 the mobile device processor may receive the user service description (USD). In an embodiment, the USD may include a description of the services available on the network and the respective services' service identifiers, channels, etc. In a further embodiment, the USD may also include a service area identifier identifying the services available in one or more service areas. In block 406 the mobile device processor may receive one or more temporary mobile group identifiers (TMGIs) for the current cell. As an example, the TMGIs may be listed in the mobile control channels (MCCHs) received by the mobile device, and may include service identifiers for services available in the current cell on the frequency corresponding to the TMGI. In block 408 the mobile device processor may compare the TMGI(s) to the USD to determine the available services for the current cell. As an example, the mobile device processor may compare the service identifiers in the TMGI(s) to the service identifiers in the USD to determine the services corresponding to the service identifiers. In block 410 the mobile device processor may generate a list of available services for the current cell.

In determination block 412, the mobile device processor may determine whether an augmented coverage configuration file is available on the mobile device. As an example, the mobile device processor may check the status of a flag in memory to determine the status of receiving an augmented coverage configuration file, may scan a memory of the mobile device to identify an augmented coverage configuration file, or may determine whether an augmented coverage configuration file is available on the mobile device in some other way. If an augmented coverage configuration file is not available (i.e., determination block 412="No"), in block 420 the mobile device processor may report the list of available services. For example, the mobile device processor may send the list of available services to an application resident on the mobile device and/or may display the availability of services, such as through pop-up icons on the display of the mobile device. If an augmented coverage configuration file is available (i.e., determination block 412="Yes"), in determination block 414 the mobile device processor may determine whether the current cell global ID is listed in the augmented coverage configuration file. In an embodiment, less than all cells in a network may be listed in the augmented coverage configuration file. For example, only those cells which overlap in coverage of a geographic area may be listed in the augmented coverage configuration file. In this manner, the size of the augmented coverage configuration file may be reduced. If the current cell global ID is not listed in the augmented coverage configuration file (i.e., determination block 414="No"), as discussed above in block 420 the mobile device processor may report the list of available services.

If the current cell global ID is listed in the augmented coverage configuration file (i.e., determination block 414="Yes"), in block 416 the mobile device processor may determine additional available services for the current cell and another cell or cells operating in/on a different frequency band and/or carrier than the current cell's frequency band and/or carrier in the augmented coverage configuration file. In an embodiment, the augmented coverage configuration file may correlate the cell global IDs of cells operating in/on a plurality of different frequency bands and/or carriers overlapping in coverage of the same geographic area and may list the services available in/on the plurality of frequency bands and/or carriers for those overlapping cells. The mobile device processor may use the received cell global ID to identify the cells in/on the different frequency bands and/or carriers that overlap the current cell and the services available in those overlapping cells. As an example, the mobile device may have received the cell global ID for the current cell which may be a band 13 cell, and the augmented coverage configuration file may indicate that the current band 13 cell is overlapped by one or more band 4 cells. The augmented coverage configuration file may list the services for the overlapping one or more band 4 cells, and may be identified by the mobile device processor as the additional available services. In block 418 the mobile device processor may add the additional available services to the list of available services for the current cell. In this manner, the list of available services may now include the services from the received TMGI(s) for the current cell and any additional services identified in the augmented coverage configuration file. As discussed above, in block 420 the mobile device processor may report the list of available services.

Figure 5:
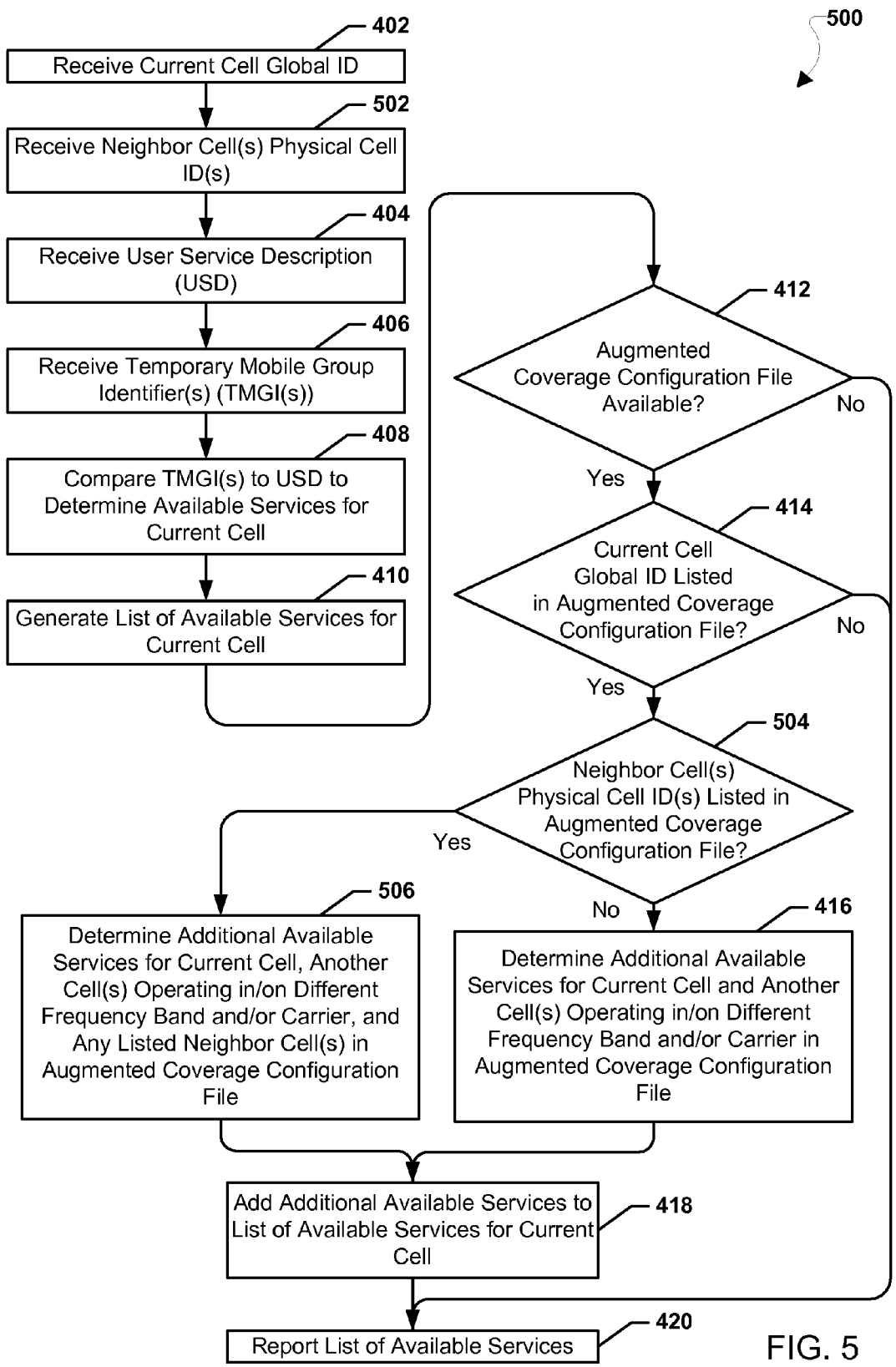
FIG. 5 is a process flow diagram illustrating another embodiment method for determining available services for a broadcast network.

FIG. 5 illustrates an embodiment method 500 similar to method 400 described above with reference to FIG. 4, except that in method 500 the augmented coverage configuration file may also include service information for neighboring cells (i.e., neighbor cells). In an embodiment, the operations of method 500 may be performed by the processor of a mobile device. As discussed above, in block 402 the mobile device processor may receive the current cell global ID. In block 502 the mobile device processor may receive neighbor cell(s) physical cell ID(s). In an embodiment, the neighbor cell physical cell ID may be received as part of the messages exchanged between the mobile device and the cellular network to establish service in the cell the mobile device is currently in. In an additional embodiment, the neighbor cell physical cell ID may be received as a result of scanning for the neighbor cell physical cell IDs during the unicast idle mode after every paging channel monitoring event. In an embodiment, the mobile device may perform inter-frequency measurements of neighboring cells when the mobile device is in a unicast idle mode regardless of a received signal level from the current cell. As an example, the mobile device may perform inter-frequency measurements of neighboring cells regardless of signal level when the augmented coverage configuration file associates the current cell global ID with a physical cell ID of a neighbor cell ("neighbor cell physical cell ID"). In another embodiment, the neighbor cell physical cell ID may be received as a result of scanning for the neighbor cell physical cell IDs in the unicast connected mode in response to network instructions telling the mobile device processor when to schedule inter-frequency measurements. In blocks 404, 406, 408, 410, 412, and 414 the mobile device processor may perform operations of like numbered blocks of method 400 described above with reference to FIG. 4.

If the current cell global ID is listed in the augmented coverage configuration file (i.e., determination block 414="Yes"), in determination block 504 the mobile device processor may determine whether any neighboring cell's physical cell ID is listed in the augmented coverage configuration file. In an embodiment, the augmented coverage configuration file may include the physical cell IDs of cells that overlap correlated with the services in those cells, and the mobile device processor may determine whether neighboring cell physical cell IDs are available by comparing the received neighbor physical cell IDs to the augmented coverage configuration file. If the neighbor cell(s) physical cell ID(s) are not listed (i.e., determination block 504="No"), as discussed above in blocks 416, 418, and 420 the additional available services may be determined, added to the available services list, and reported. If the neighbor cell physical cell ID is listed in the augmented coverage configuration file (i.e., determination block 504="Yes"), in block 506 the mobile device processor may determine the additional available service for the current cell, another cell or cells operating in/on a different frequency band and/or carrier than the current cell's frequency band, and any listed neighbor cell(s) in the augmented coverage configuration file. In an embodiment, the augmented coverage configuration file may correlate the cell global IDs and physical cell IDs of cells operating in/on different frequency bands and/or carriers overlapping in coverage of the same geographic and may list the services available in/on a plurality of frequency bands and/or carriers for those overlapping cells. The mobile device processor may use the received cell global ID and physical cell IDs to identify the cells that overlap the current cell and the services available in those overlapping cells in/on the different frequency bands and/or carriers. As an example, the mobile device processor may identify the services for the current band 13 cell, its overlapping band 4 cells, the current cell's band 13 neighbor, and the neighboring band 4 cells. In block 418 the mobile device processor may add the additional available services to the list of available services. In this manner, the list of available services may include the services identified by the received TMGI, the services of the overlapping cells, and the services of neighboring cells. As discussed above, in block 420 the mobile device processor may report the list of available services.

Figure 6:
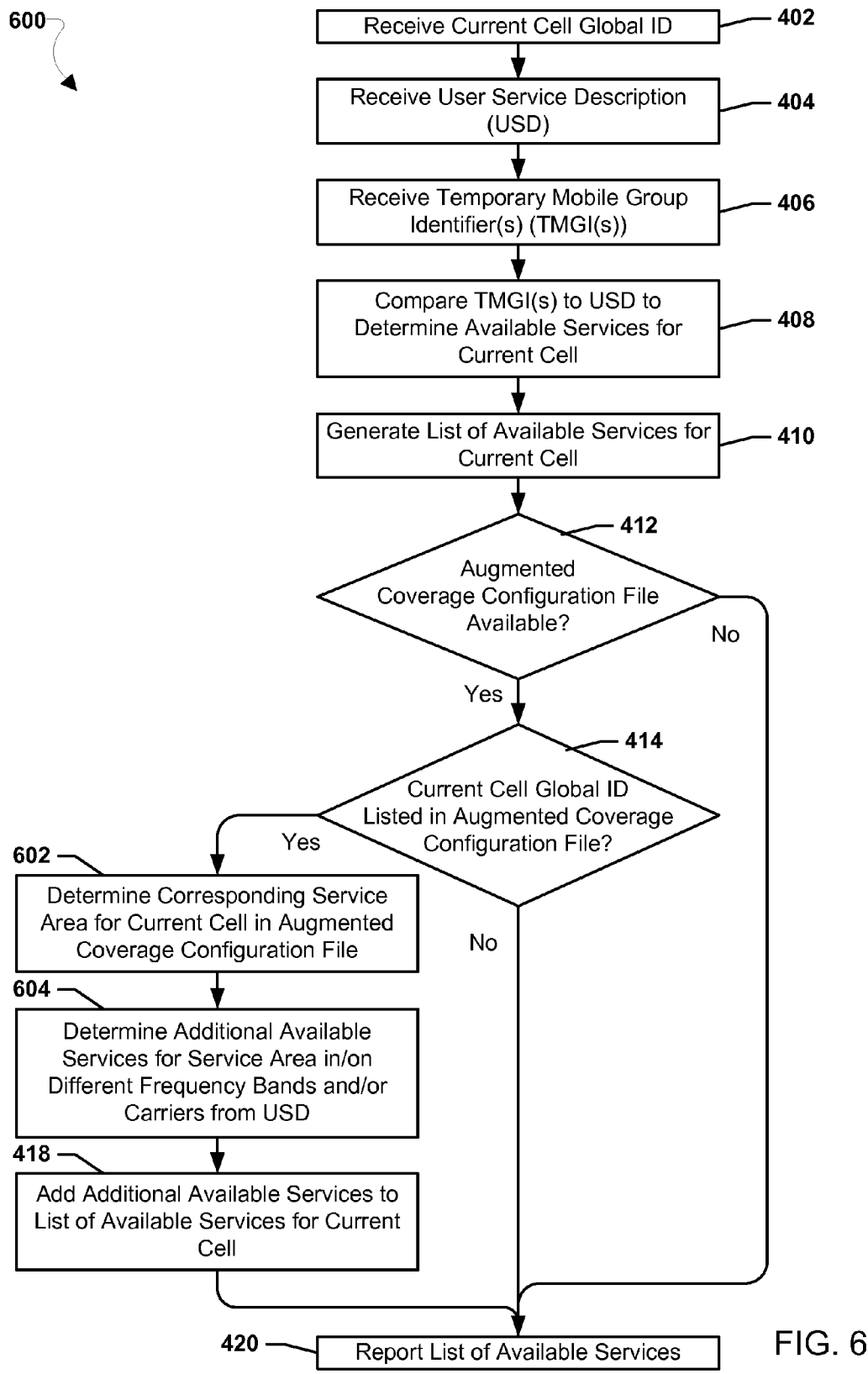
FIG. 6 is a process flow diagram illustrating a third embodiment method for determining available services for a broadcast network.

FIG. 6 illustrates an embodiment method 600 similar to method 400 described above with reference to FIG. 4, except that in method 600 the augmented coverage configuration file may correlate cell global IDs with service areas listed in the USD. In an embodiment, the operations of method 600 may be performed by the processor of a mobile device. As discussed above, in an embodiment, the USD may include information relating service areas to their respective services. In blocks 402, 404, 406, 408, 410, 412, and 414 the mobile device processor may perform operations of like numbered blocks described above with reference to FIG. 4. If the current cell global ID is listed in the augmented coverage configuration file (i.e., determination block 414="Yes"), in block 602 the mobile device processor may determine the corresponding service area for the current cell in the augmented coverage configuration file. In an embodiment, the augmented coverage configuration file may correlate global cell IDs to their assigned service areas in/on a plurality of frequency bands and/or carriers. In block 604 the mobile device processor may determine the additional available services for the service area from the USD. In an embodiment, the USD may list the services in/on a plurality of different frequency bands and/or carriers for each service area, and by comparing the determined service area ID to the USD the mobile device processor may determine the services available in/on different frequency bands and/or carriers for the service area. For example, the USD may list services in frequency band 4 and frequency band 13, and by comparing the determined service area ID to the USD the mobile device processor may determine services available in the two different frequency bands, 4 and 13, for the service area. As discussed above in block 418 the mobile device processor may add the additional available services to the list of available services for the current cell, and in block 420 the mobile device may report the list of available services.

Figure 7:
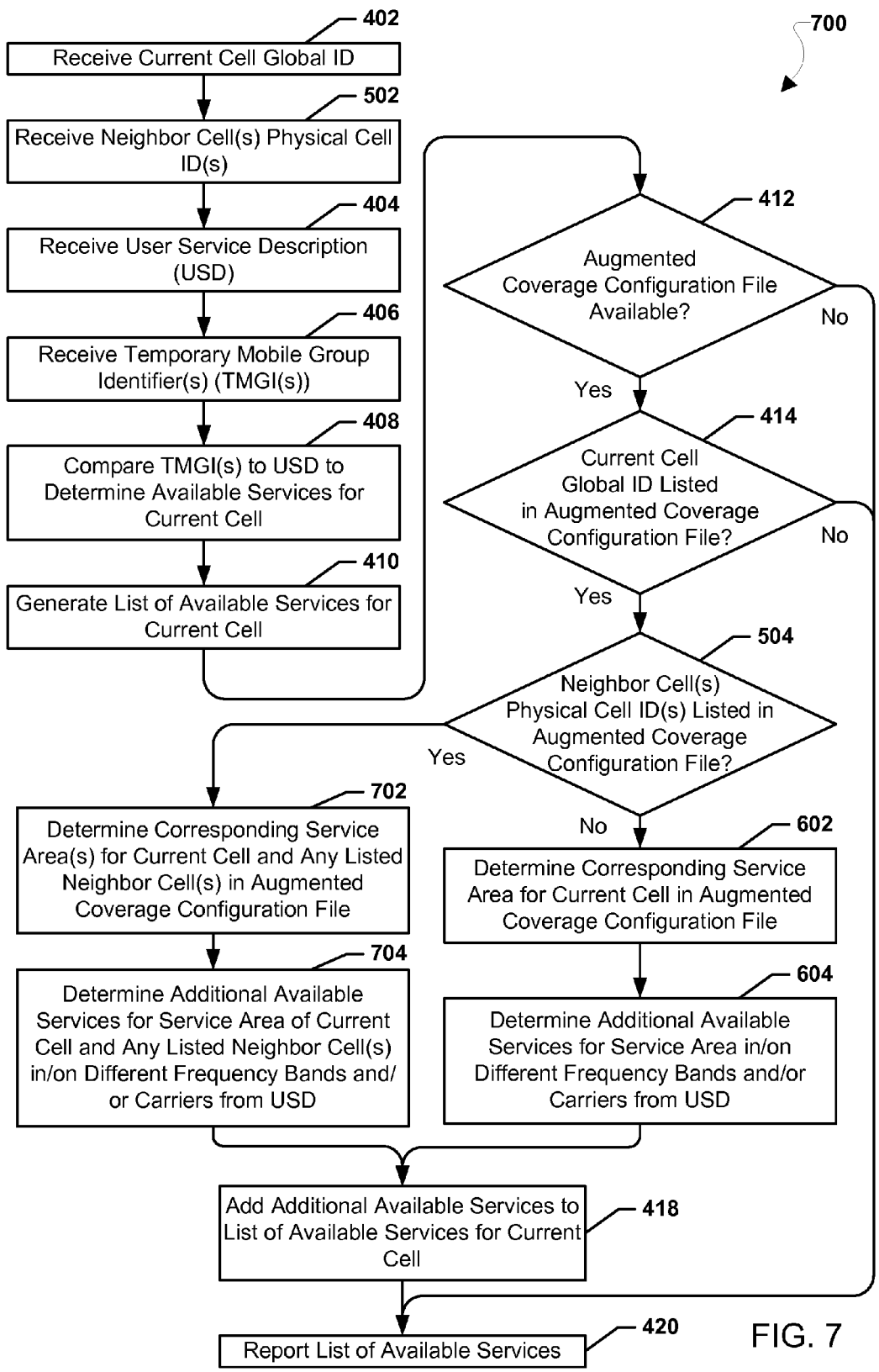
FIG. 7 is a process flow diagram illustrating a fourth embodiment method for determining available services for a broadcast network.

FIG. 7 illustrates an embodiment method 700 similar to method 600 described above with reference to FIG. 6, except that in method 700 the augmented coverage configuration file may correlate cell global IDs and physical cell IDs with service areas listed in the USD. In an embodiment, the operations of method 700 may be performed by the processor of a mobile device. In blocks 402, 502, 404, 406, 408, 410, 412, 414, and 504 the mobile device processor may perform operations of like numbered blocks described above with reference to FIG. 5. If the neighbor cell(s) physical cell ID(s) are listed in the augmented coverage configuration file (i.e., determination block 504="Yes"), in block 702 the mobile device processor may determine the corresponding service area for the current cell and any listed neighboring cells in the augmented coverage configuration file. In an embodiment, the augmented coverage configuration file may correlate global cell IDs and physical cell IDs to their assigned service areas for a plurality of different frequency bands and/or carriers. In block 704 the mobile device processor may determine the additional available services for the service area of the current cell and any listed neighboring cells in/on a plurality of different frequency bands and/or carriers from the USD. In an embodiment, the USD may list the services in/on a plurality of frequency bands and/or carriers for each service area, and by comparing the determined service area ID to the USD the mobile device processor may determine the services in/on the different frequency bands and/or carriers for the service areas. As discussed above in block 418 the mobile device processor may add the additional available services to the list of available services for the current cell, and in block 420 the mobile device may report the list of available services.

Figure 8:
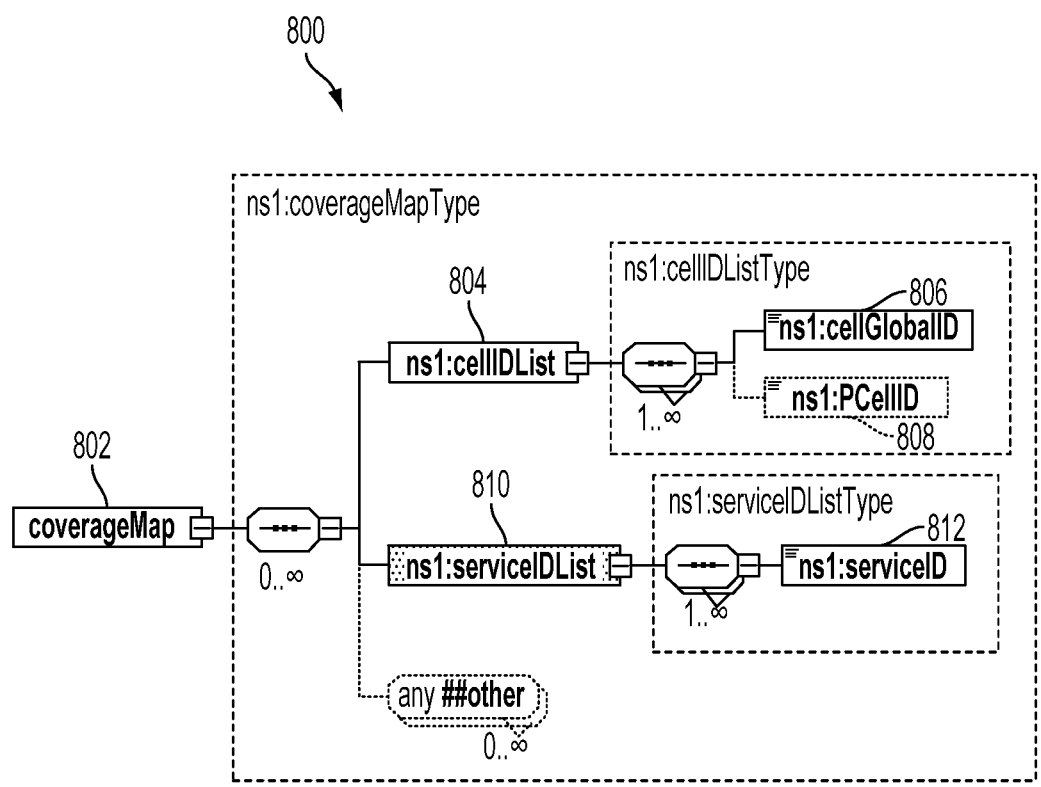
FIG. 8 is a data structure diagram illustrating potential elements of an augmented coverage configuration file according to an embodiment.

FIG. 8 is a data structure diagram illustrating potential elements of an augmented coverage configuration file 800. In an embodiment, the augmented coverage configuration file 800 may be a coverage map 802 correlating cells 804 with the services 810 provided in those cells. In an embodiment, the cells 804 may be identified by their cell global IDs 806. In an optional embodiment, the availability of service may be indicated by both the cells 804 and the physical cell IDs 808 of the neighboring cell carrying the service. In another optional embodiment, the cells 804 may also be identified by their physical cell IDs 808. In an embodiment, the augmented coverage configuration file 800 may link cells 804 in/on different frequency bands and/or carriers which overlap to provide coverage to the same geographic areas. In an embodiment, the services 810 may include the service IDs 812 for the various services 810 provide by each cell 804.

Figure 9:
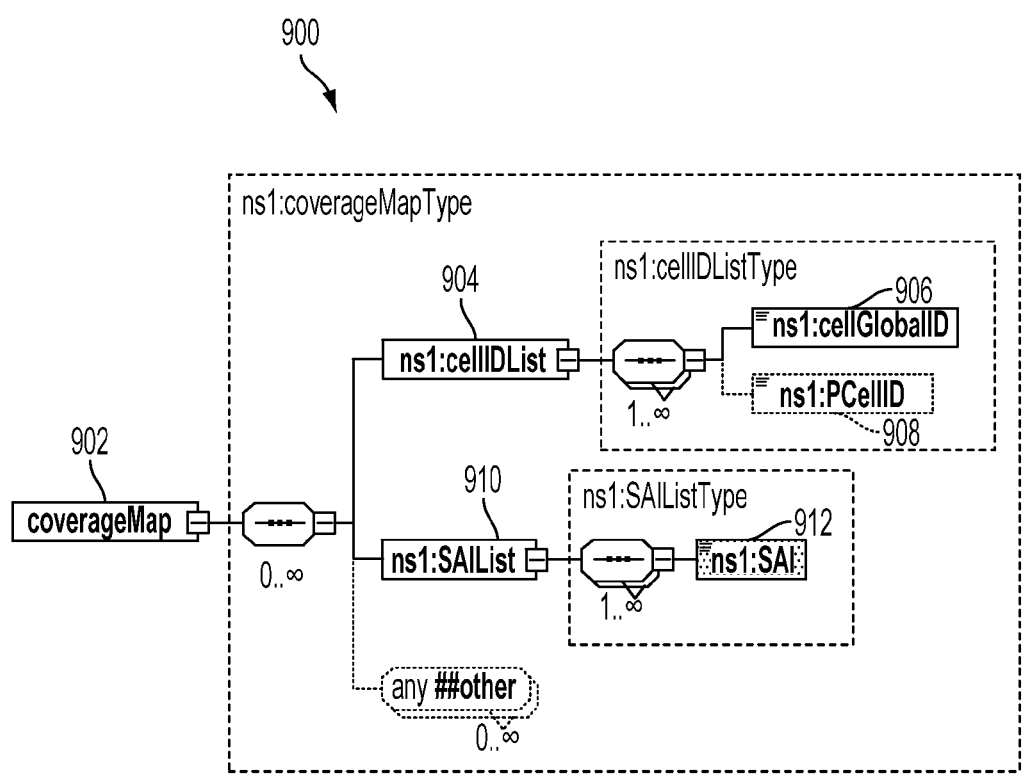
FIG. 9 is a data structure diagram illustrating potential elements of another augmented coverage configuration file according to an embodiment.

FIG. 9 is a data structure diagram illustrating potential elements of an augmented coverage configuration file 900. In an embodiment, the augmented coverage configuration file 900 may be a coverage map 902 correlating cells 904 with the service areas 910 those cells 904 are part of. In an embodiment, the cells 904 may be identified by their cell global IDs 906. In an optional embodiment, the cells 904 may also be identified by their physical cell IDs 908. In an embodiment, the augmented coverage configuration file 900 may link cells 904 in/on different frequency bands and/or carriers which overlap to provide coverage to the same geographic areas. In an embodiment, the service areas 910 may include the service area IDs 912 for the various service areas for which cell 904 may be a part.

Figure 10:
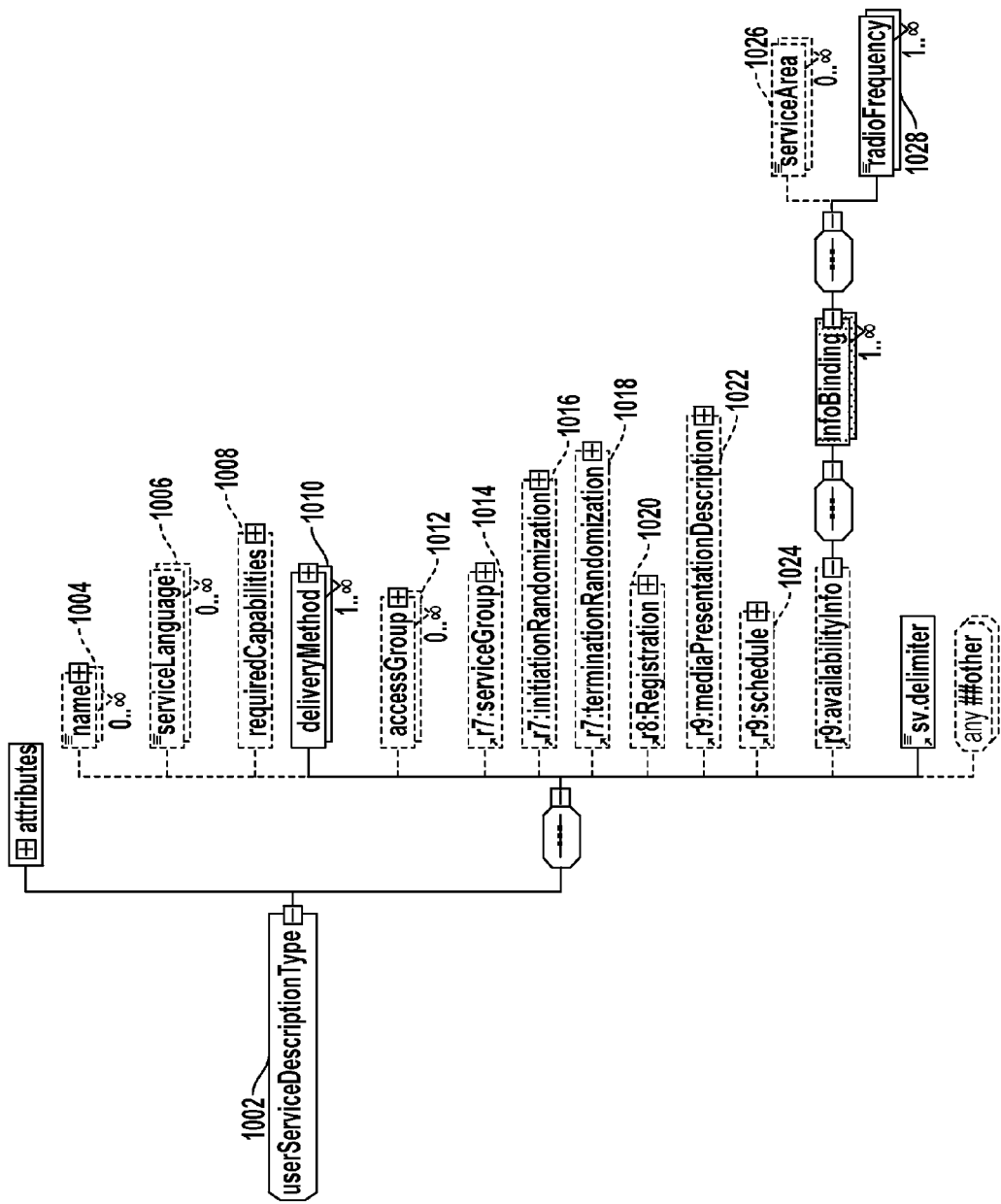
FIG. 10 is a data structure diagram illustrating potential elements of a user service description suitable for use with the various embodiments.

FIG. 10 is a data structure diagram of a user service description (USD) 1002 suitable for use with the various embodiments. In an embodiment, the USD may include various data elements, including name 1004, service language 1006, required capabilities 1008, delivery method 1010, access group 1012, service group 1014, initiation information 1016, termination information 1018, registration information 1020, a media presentation description (MPD) 1022, schedule 1024, and availability information including service area information 1026 and the services and radio frequency information 1028 for each listed service area 1026.

Figure 11A:
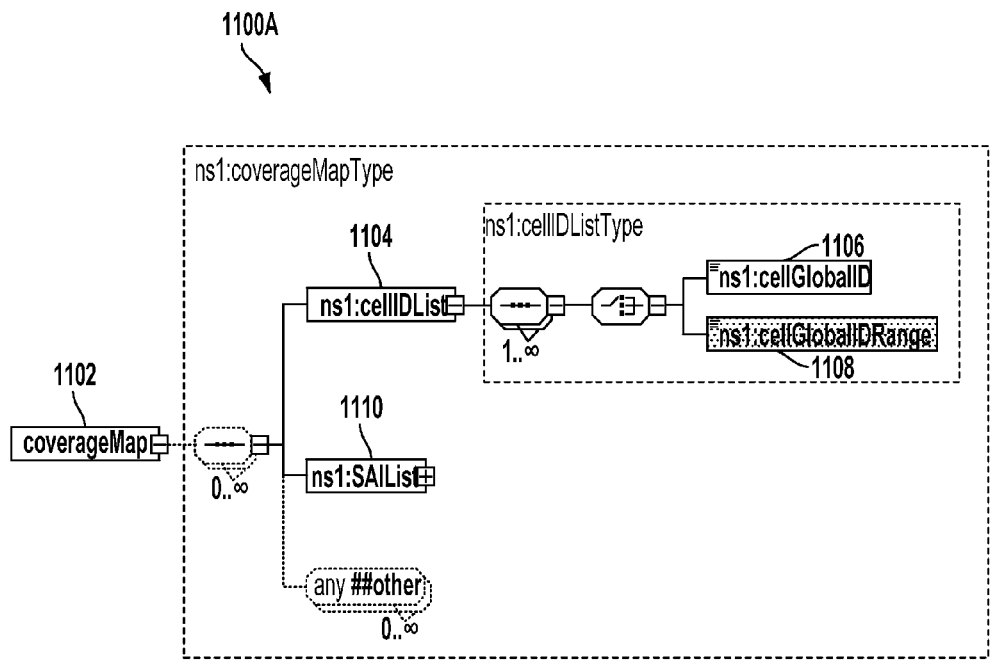
FIG. 11A is a data structure diagram illustrating potential elements of a third augmented coverage configuration file according to an embodiment.

FIG. 11A is a data structure diagram illustrating potential elements of an augmented coverage configuration file 1100A. In an embodiment, the augmented coverage configuration file 1100A may be a coverage map 1102 correlating cells 1104 with the service areas 1110 those cells 1104 are part of. In an embodiment, the cells 1104 may be identified by their cell global IDs 1106. Additional, the augmented coverage configuration file 1100 may also include ranges associated with the cell global IDs and the services associated with those ranges. In an embodiment, the augmented coverage configuration file 1100 may link cells 1104 in/on different frequency bands and/or carriers which overlap to provide coverage to the same geographic areas. In an embodiment, the service areas 1110 may be mapped to both specific cell global IDs 1106 and ranges 1108. In this manner, an additional cell may be added by the network without requiring the updating of the augmented coverage configuration file 1100 when the cell global ID of the added cell is set to fall within a predefined range 1108. In a further embodiment, the physical cell ID of the neighboring cell associated with a range of cell global IDs may be provided as a range.

Figure 11B:
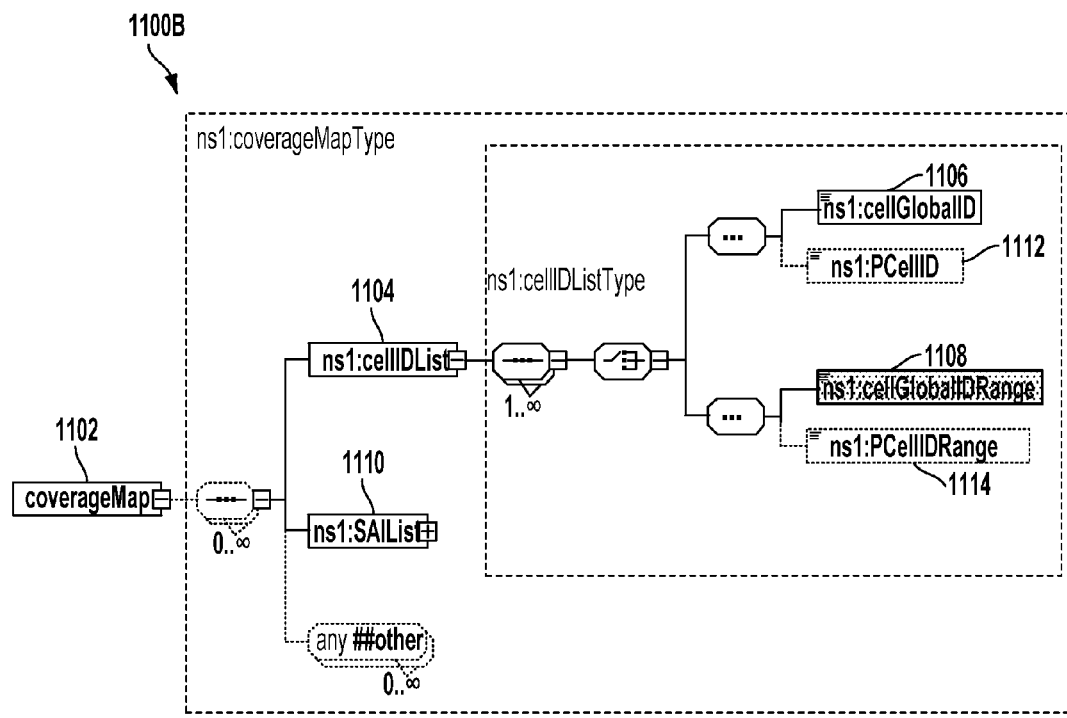
FIG. 11B is a data structure diagram illustrating potential elements of a fourth augmented coverage configuration file according to an embodiment.

FIG. 11B is a data structure diagram illustrating potential elements of an augmented coverage configuration file 1100B. Such an augmented coverage configuration file 1100B is similar to the augmented coverage file 1100A illustrated in FIG. 11A, except that the augmented coverage configuration file 1100B may optionally include physical cell IDs 1112 and/or physical cell ID ranges 1114. In an embodiment, the service areas 1110 may be mapped to specific cell global IDs 1106 and, optionally, to specific physical cell IDs 1112, as well as cell global ID ranges 1108 and optionally physical cell ID ranges 1114.

Figure 12:
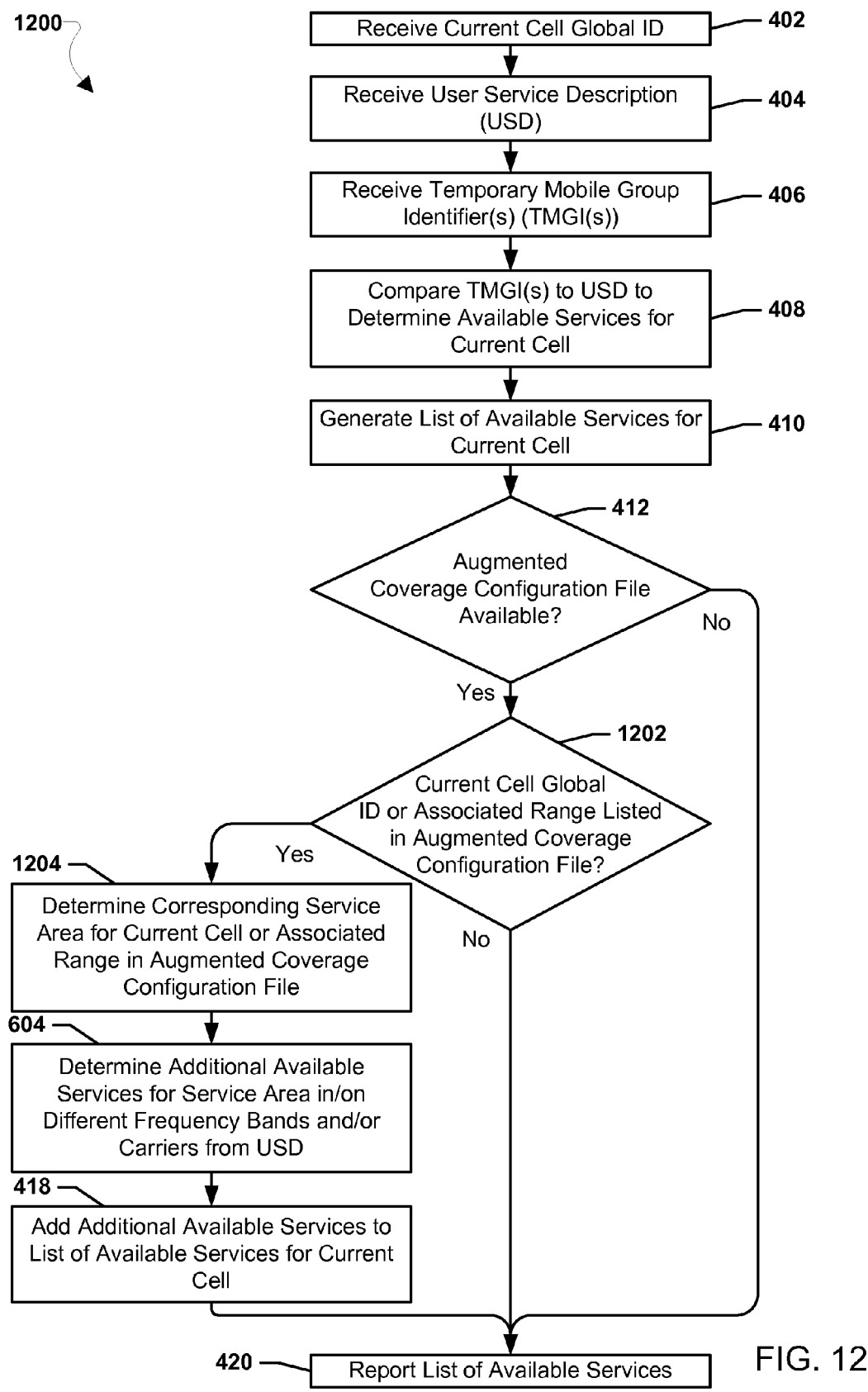
FIG. 12 is a process flow diagram illustrating a fifth embodiment method for determining available services for a broadcast network.

FIG. 12 is a process flow diagram illustrating an embodiment method 1200 similar to method 600 described above with reference to FIG. 6, except that in method 1200 the augmented coverage configuration file may correlate cell global IDs and ranges of cell global IDs with service areas listed in the USD. In an embodiment, the operations of method 1200 may be performed by the processor of a mobile device. As discussed above, in an embodiment, the USD may include information relating service areas to their respective services. In blocks 402, 404, 406, 408, 410, and 412 the mobile device processor may perform operations of like numbered blocks described above with reference to FIG. 4. If the augmented coverage configuration file is available (i.e., determination block 412="Yes"), in block 1202 the mobile device processor may determine whether the current cell global ID or the associated range is listed in the augmented coverage configuration file. In an embodiment, the augmented coverage configuration file may include cell global IDs and ranges of cell global IDs. In this manner, though the specific cell global ID may not be listed, the cell global ID may fall in an identified range that may be correlated with a service area listed in the augmented coverage configuration file. If the current cell or range are not listed (i.e., determination block 1202="No"), as discussed above in block 420 the mobile device processor may report the list of available services. If the current cell global ID or range are listed (i.e., determination block 1202="Yes"), in block 1204 the mobile device processor may determine the corresponding service area for the current cell or associated range in the augmented coverage configuration file. In an embodiment, the augmented coverage configuration file may correlate global cell IDs and ranges of global cell IDs to their assigned service areas. As discussed above, in block 604 the mobile device processor may determine the additional available services in/on different frequency bands and/or carriers for the service area from the USD, in block 418 the mobile device processor may add the additional available services to the list of available services for the current cell, and in block 420 the mobile device may report the list of available services.

Figure 13:
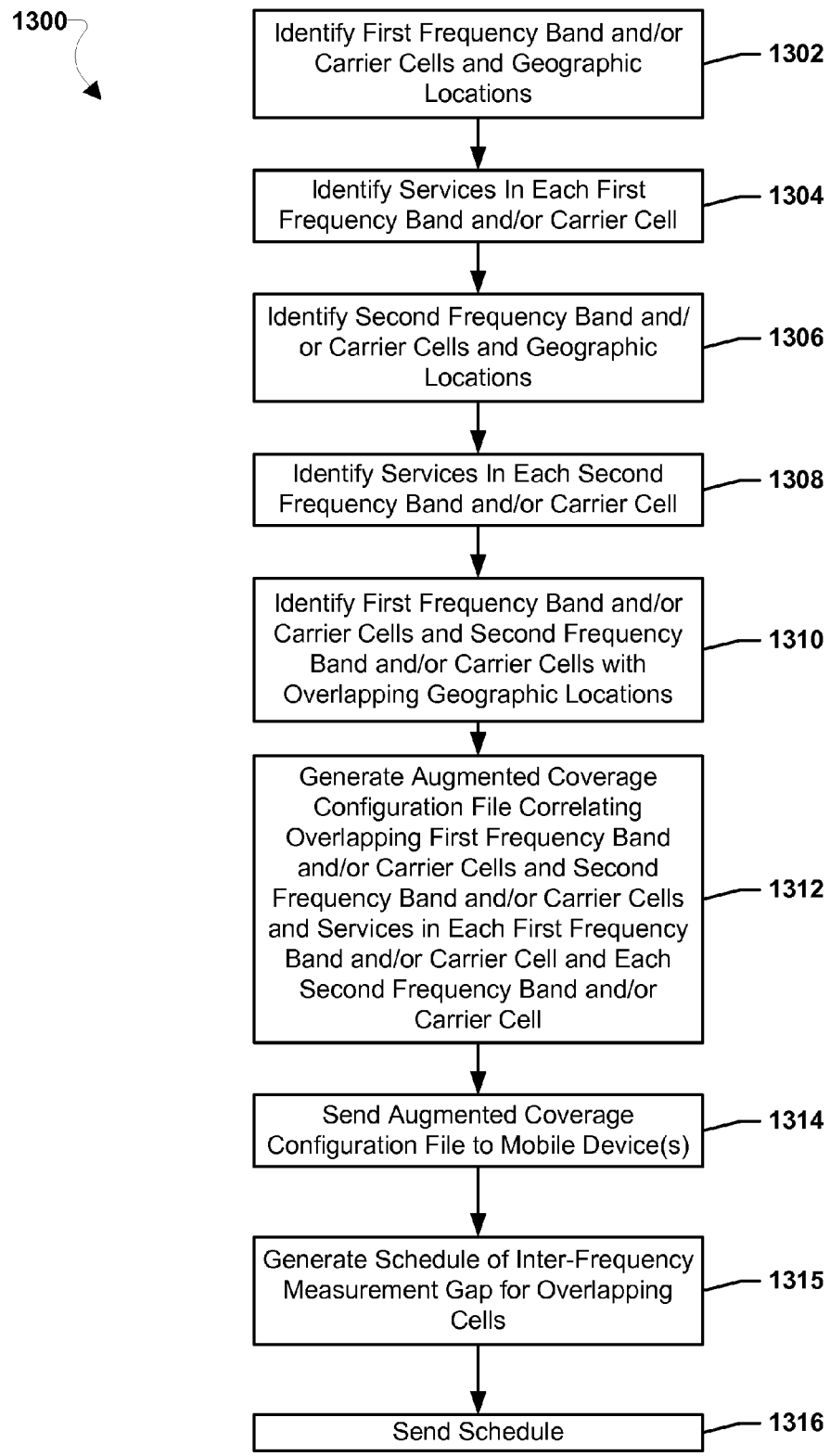
FIG. 13 is a process flow diagram illustrating an embodiment method for generating an augmented coverage configuration file.

FIG. 13 illustrates an embodiment method 1300 for generating an augmented coverage configuration file. In an embodiment, the operations of method 1300 may be performed by a server, such as a server of a broadcast network operator. In block 1302 the server may identify the first frequency band and/or carrier cells and their corresponding geographic locations. As an example, the server may identify the global cell IDs and/or physical cell IDs of band 13 cells in the network and their geographic coverage areas. In block 1304 the server may identify available services in each first frequency band and/or carrier cell. As an example, the server may identify the broadcast services in each band 13 cell in the network. In block 1306 the server may identify the second frequency band and/or carrier cells and their corresponding geographic locations. As an example, the server may identify the global cell IDs of band 4 cells and optionally the physical cell IDs of band 4 cells in the network and their geographic coverage areas. In block 1308 the server may identify available services in each second frequency band and/or carrier cell. As an example, the server may identify the broadcast services in each band 4 cell in the network. In block 1310 the server may identify the first frequency band and/or carrier cells and second frequency band and/or carrier cells with overlapping geographic locations. As an example, the server may compare the identified geographic coverage areas for each of the band 13 cells to the identified geographic coverage areas of each of the band 4 cells in the network to identify band 13 cells and band 4 cells with overlapping geographic coverage areas as cells with overlapping geographic locations. In block 1312 the server may generate an augmented coverage configuration file correlating overlapping first frequency band and/or carrier cells and second frequency band and/or carrier cells and services in each first frequency band and/or carrier cell and each second frequency band and/or carrier cell. As an example, the server may generate an augmented coverage configuration file linking 13 and band 4 cells with overlapping geographic locations and listing the services available in all band 13 and band 4 cells in the network. In block 1314 the server may send the augmented coverage configuration file to one or more mobile devices on the network. In block 1315 the server may generate a schedule defining an inter-frequency measurement gap for overlapping cells in the network. In an embodiment, the schedule may indicate to a mobile device the periodicity of inter-frequency measurements that should be made in the unicast connected mode to identify neighboring cell IDs, such as neighboring cell physical cell IDs. In block 1316 the server may send the schedule. For example, the server may send the schedule to mobile devices in and/or entering service areas including overlapping cells.

Figure 14:
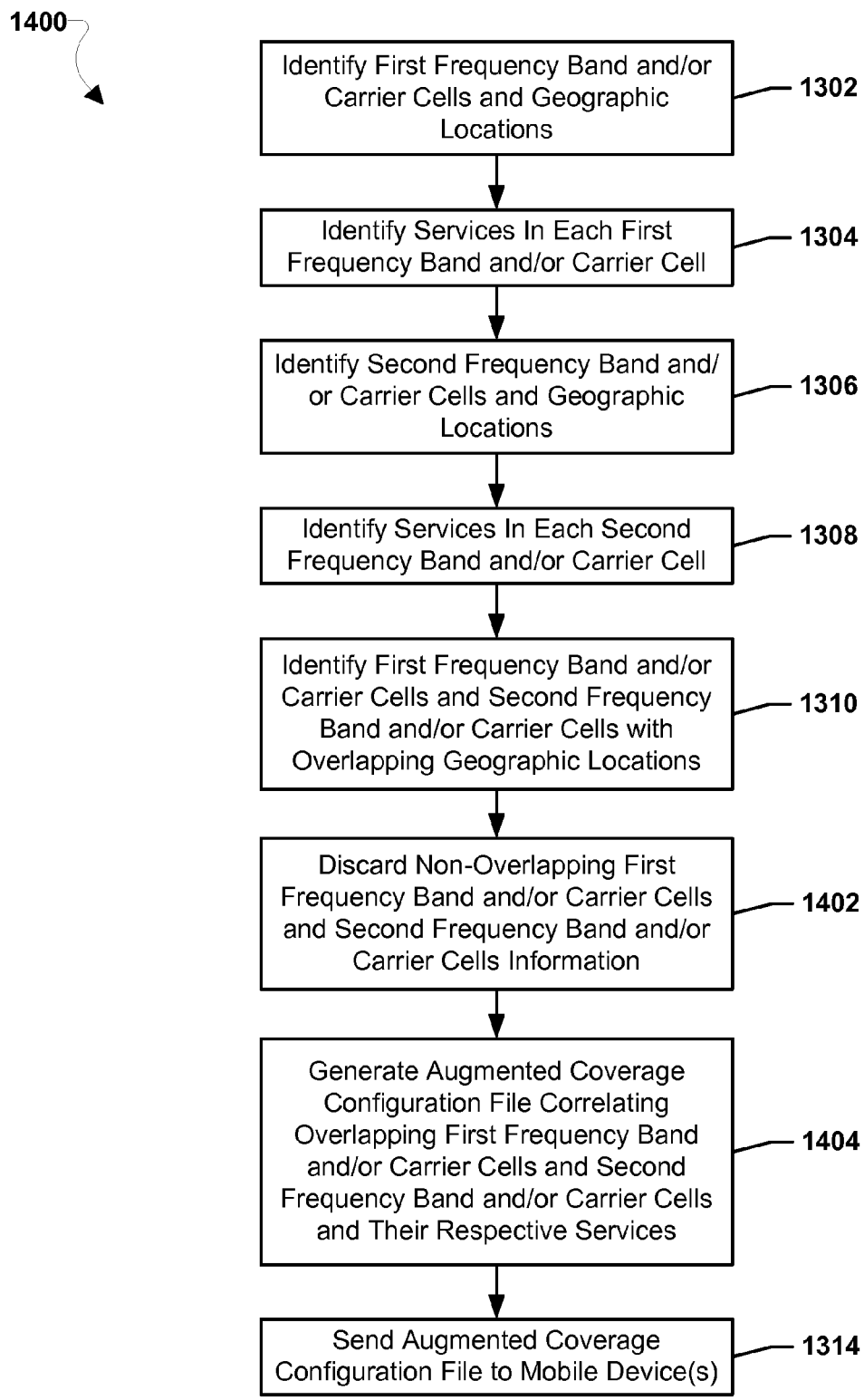
FIG. 14 is a process flow diagram illustrating another embodiment method for generating an augmented coverage configuration file.

FIG. 14 illustrates an embodiment method 1400 for generating an augmented coverage configuration file similar to method 1300 described above with reference to FIG. 13, except that in method 1400 non-overlapping cell information may not be included in the augmented coverage configuration file. In an embodiment, the operations of method 1400 may be performed by a server, such as a server of a broadcast network operator. In blocks 1302, 1304, 1306, 1308, and 1310 the operations of like numbered blocks of method 1300 described above with reference to FIG. 13 may be performed by the server. In block 1402 the server may discard information for non-overlapping first frequency band and/or carrier cells and second frequency band and/or carrier cells. In block 1404 the server may generate an augmented coverage configuration file correlating overlapping first frequency band and/or carrier cells and second frequency band and/or carrier cells and their respective services. In this manner, cells that do not overlap may not be included in the augmented coverage configuration file, and the size of the augmented coverage configuration file may be reduced. As discussed above, in block 1314 the server may send the augmented coverage configuration file to one or more mobile devices on the network.

Figure 15:
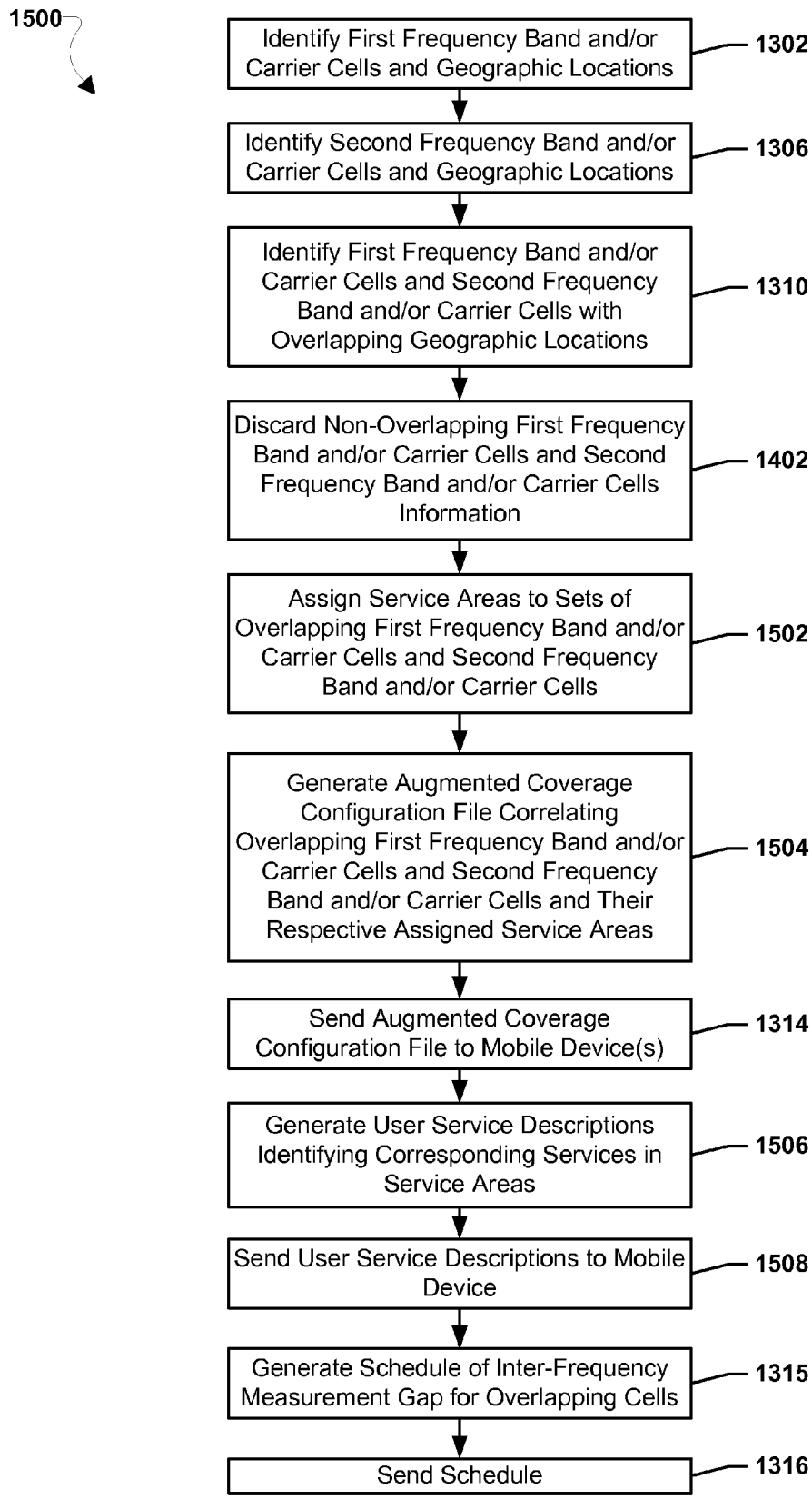
FIG. 15 is a process flow diagram illustrating a third embodiment method for generating an augmented coverage configuration file.

FIG. 15 illustrates an embodiment method 1500 for generating an augmented coverage configuration file similar to method 1400 described above with reference to FIG. 14, except that in method 1500 service area information for the overlapping cells may be provided in the augmented coverage configuration file. In an embodiment, the operations of method 1500 may be performed by a server, such as a server of a broadcast network operator. In blocks 1302, 1306, 1310, and 1402 the operations of like numbered blocks of method 1400 described above with reference to FIG. 14 may be performed by the server. In block 1502 the server may assign service areas to sets of overlapping first frequency band and/or carrier cells and second frequency band and/or carrier cells. In block 1504 the server may generate an augmented coverage configuration file correlating overlapping first frequency band and/or carrier cells and second frequency band and/or carrier cells and their respective assigned service areas. In block 1314 the server may send the augmented coverage configuration file to the mobile device(s). In block 1506 the server may generate user service descriptions identifying the corresponding services in the service areas. In block 1508 the server may send the user service descriptions to the mobile devices. As discussed above, in blocks 1315 and 1316 the server may generate a schedule defining the inter-frequency measurement gap for overlapping cells and send the schedule. In an embodiment, the server may only send the schedule to mobile devices in cells whose cell global ID is associated with physical cell IDs of neighboring cells listed in the augmented coverage file.

Figure 16:
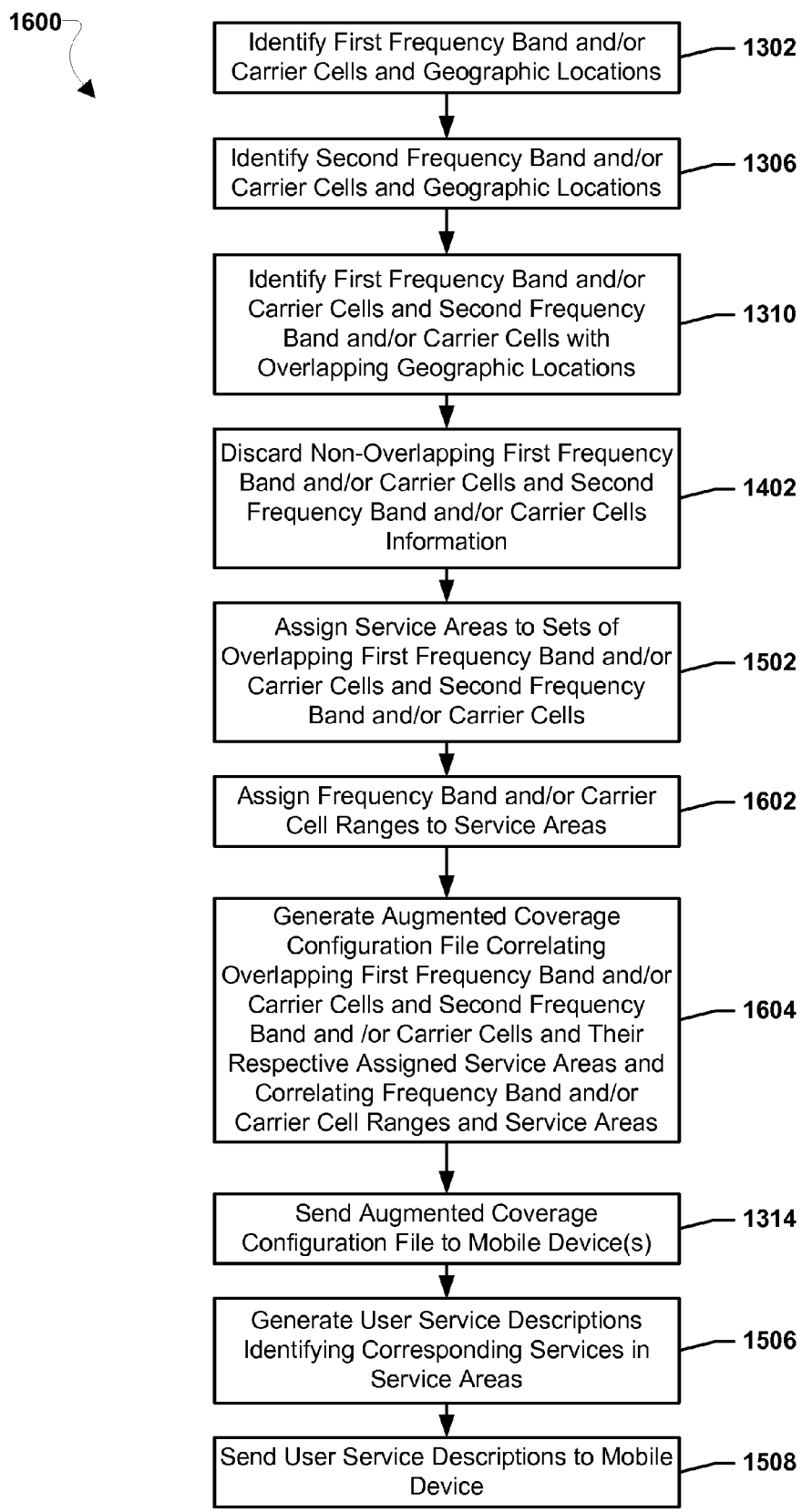
FIG. 16 is a process flow diagram illustrating a fourth embodiment method for generating an augmented coverage configuration file.

FIG. 16 illustrates an embodiment method 1600 for generating an augmented coverage configuration file similar to method 1500 described above with reference to FIG. 15, except that in method 1600 service areas may be correlated to ranges of cells in the augmented coverage configuration file. In blocks 1302, 1306, 1310, 1402, and 1502 the operations of like numbered blocks of method 1500 described above with reference to FIG. 15 may be performed by the server. In block 1602 the server may assign frequency band and/or carrier cell ranges to the service areas. As an example, a service area may be assigned 5000 series cell global IDs. In this manner, though the cell global ID may not be identified, any cell global ID falling in the range may be associated with the service area. In block 1604 the server may generate an augmented coverage configuration file correlating overlapping first frequency band and/or carrier cells and second frequency band and/or carrier cells and their respective assigned service areas and correlating frequency band and/or carrier cell ranges and service areas. As discussed above, in block 1314 the server may send the augmented coverage configuration file, in block 1506 the server may generate the USD, and in block 1508 the server may send the USD.

Figure 17:
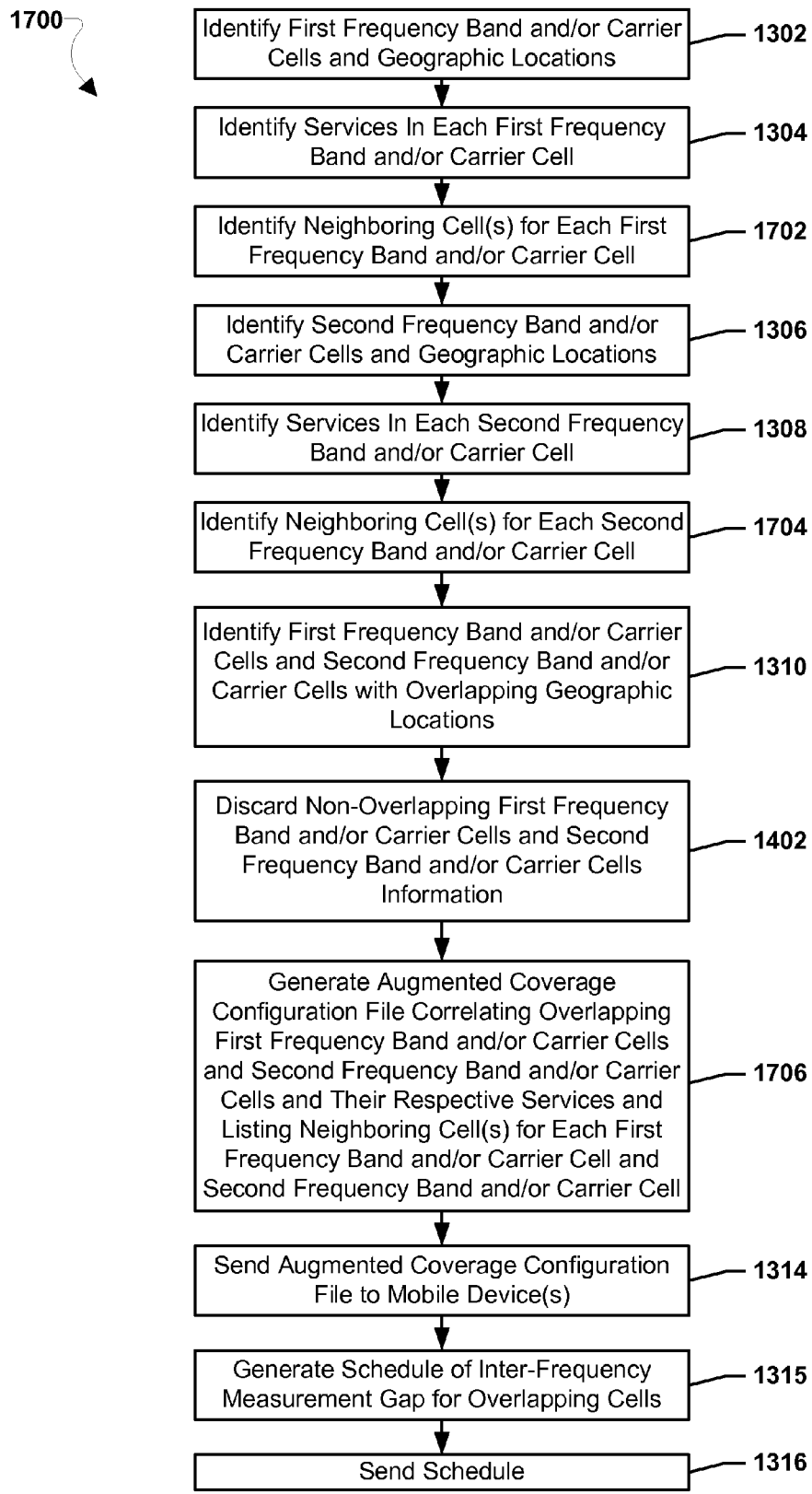
FIG. 17 is a process flow diagram illustrating a fifth embodiment method for generating an augmented coverage configuration file.

FIG. 17 illustrates an embodiment method 1700 for generating an augmented coverage configuration file similar to method 1400 described above with reference to FIG. 14, except that in method 1700 cell IDs and neighboring cell IDs (i.e., neighbor cell IDs) may be correlated in the augmented coverage configuration file. In an embodiment, the operations of method 1700 may be performed by a server, such as a server of a broadcast network operator. In blocks 1302 and 1304 the operations of like numbered blocks of method 1400 described above with reference to FIG. 14 may be performed by the server. In block 1702 the server may identify the neighboring cells for each first frequency band and/or carrier cell. In an embodiment, the cell global ID and/or physical cell ID may be identified for the neighboring cells. In blocks 1306 and 1308 the operations of like numbered blocks of method 1400 described above with reference to FIG. 14 may be performed by the server. In block 1704 the server may identify the neighboring cells for each second frequency band and/or carrier cells. In an embodiment, the cell global ID and/or physical cell ID may be identified for the neighboring cells. In blocks 1310 and 1402 the operations of like numbered blocks of method 1400 described above with reference to FIG. 14 may be performed by the server. In block 1706 the server may generate the augmented coverage configuration file correlating the overlapping first and second frequency band and/or carrier cells and their respective services and listing neighboring cells for each first frequency band and/or carrier cell and second frequency band and/or carrier cell. As discussed above, in block 1314 the server may send the augmented coverage configuration file, and in blocks 1315 and 1316 the server may generate a schedule defining the inter-frequency measurement gap for overlapping cells and send the schedule.

In an embodiment, an augmented coverage configuration file may be generated in response to cellular network deployment changes. As examples network deployment changes such as the addition/subtract of cells, establishment/disestablishment of venues, and the modification of cell information may trigger the generation of a new or updated augmented coverage configuration file. In an embodiment, the server may determine a network deployment change has occurred and in response may perform operations of methods 1300, 1400, 1500, 1600, and/or 1700, to generate and send an augmented configuration file reflecting the network deployment change.

Figure 18:
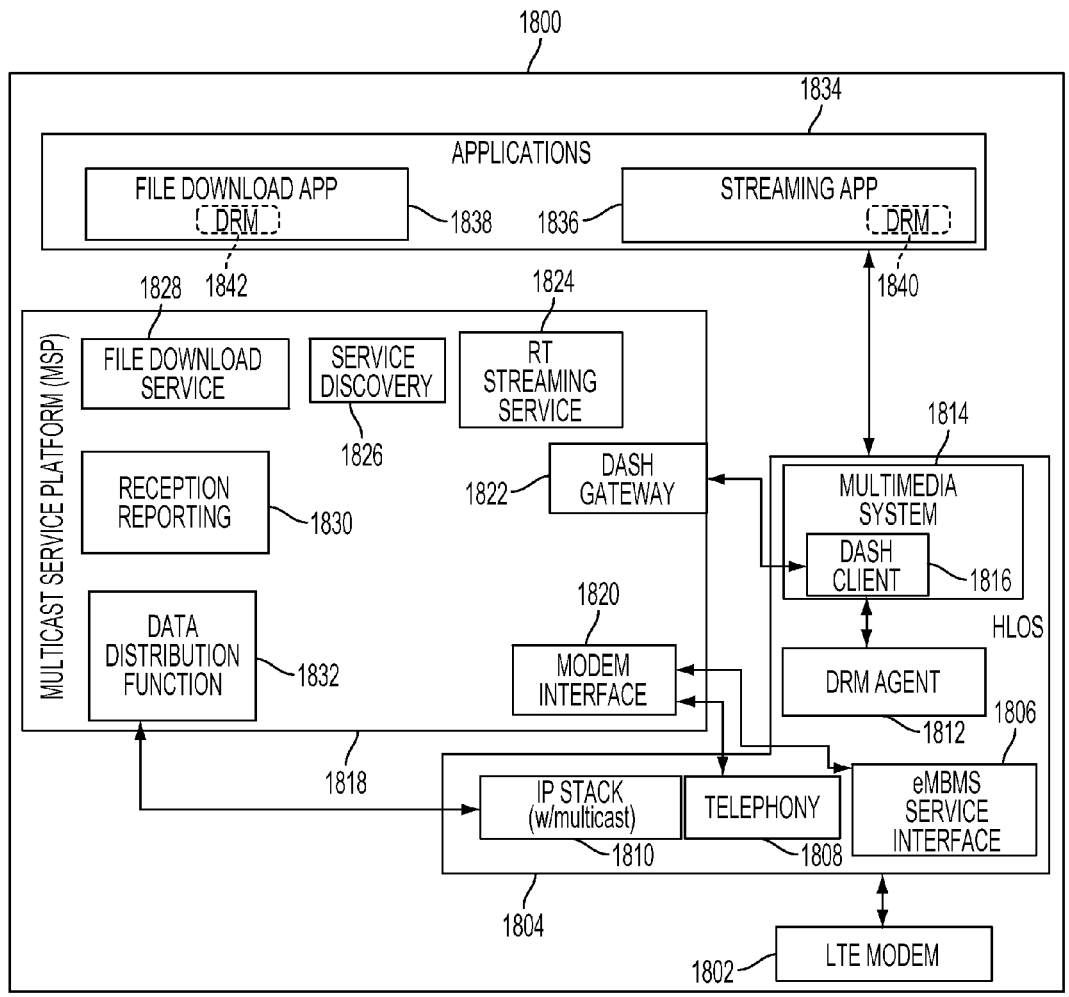
FIG. 18 is a component block diagram of an example mobile device suitable for use with the various embodiments.

The various embodiments may be implemented in any of a variety of mobile devices, an example of which is illustrated in FIG. 18. For example, the mobile device 1800 may include an LTE modem 1802 which may be in communication with various modules, including a hardware level operating system 1804, multicast service platform 1818, and applications 1834. The hardware level operating system 1804 may include a multimedia system 1814 including a DASH client 1816 in communication with a digital rights management agent 1812. The hardware level operating system 1804 may also include a eMBMS service interface 1806, telephony module 1808 and IP stack with multicast 1810. The multicast service platform 1818 may include data distribution function 1832, modem interface 1820, DASH gateway 1822, RT streaming service 1824, service discovery module 1826, file download server 1828, and reception reporting module 1830. Applications 1834 may include file download applications 1838 and associated digital rights management 1842 and streaming applications 1836 and associated digital rights management 1840.

Figure 19:
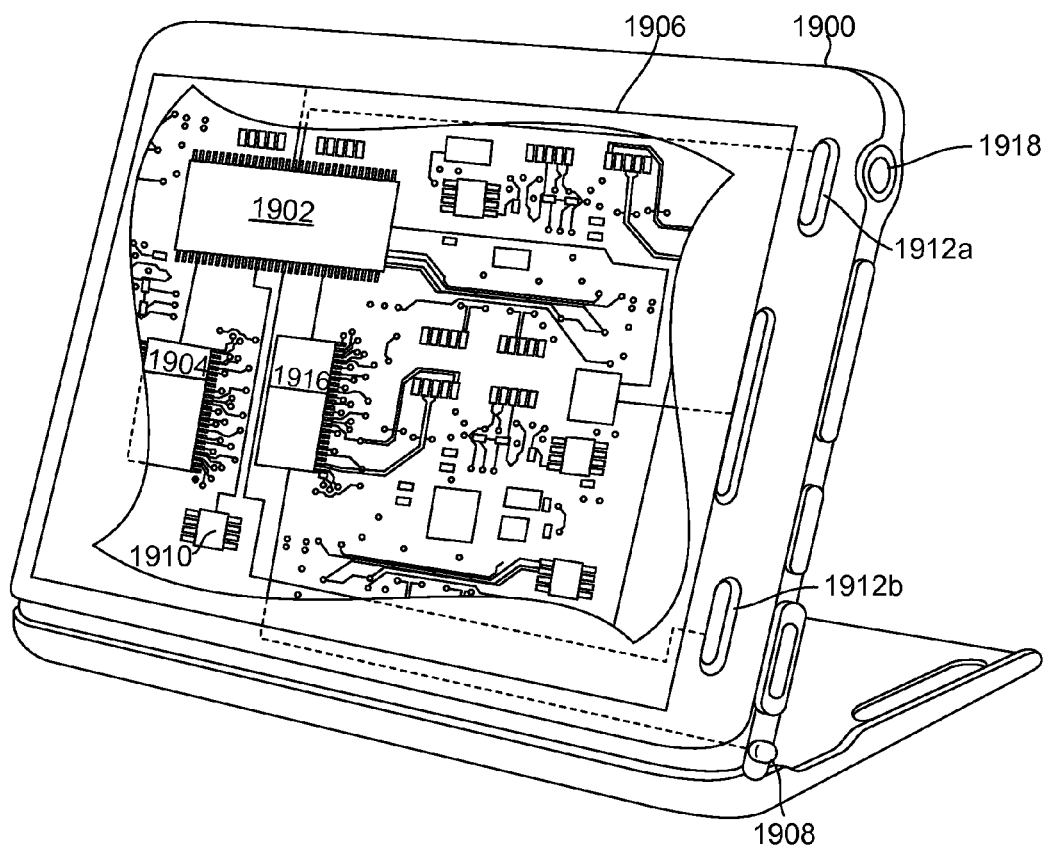
FIG. 19 is a component diagram of another example mobile device suitable for use with the various embodiments.

The various embodiments may be implemented in any of a variety of mobile devices, an example of which is illustrated in FIG. 19. For example, the mobile device 1900 may include a processor 1902 coupled to internal memories 1904 and 1910. Internal memories 1904 and 1910 may be volatile or nonvolatile memories, and may also be secure and/or encrypted memories, or unsecure and/or unencrypted memories, or any combination thereof. The processor 1902 may also be coupled to a touch screen display 1906, such as a resistive-sensing touch screen, capacitive-sensing touch screen infrared sensing touch screen, or the like. Additionally, the display of the mobile device 1900 need not have touch screen capability. Additionally, the mobile device 1900 may have one or more antenna 1908 for sending and receiving electromagnetic radiation that may be connected to one or more network transceivers 1916, such as a wireless data link and/or cellular (e.g., CDMA, TDMA, GSM, PCS, 3G, 4G, LTE, or any other type) transceiver, coupled to the processor 1902. The mobile device 1900 may also include physical buttons 1912a and 1912b for receiving user inputs. The mobile device 1900 may also include a power button 1918 for turning the mobile device 1900 on and off.

Figure 20:
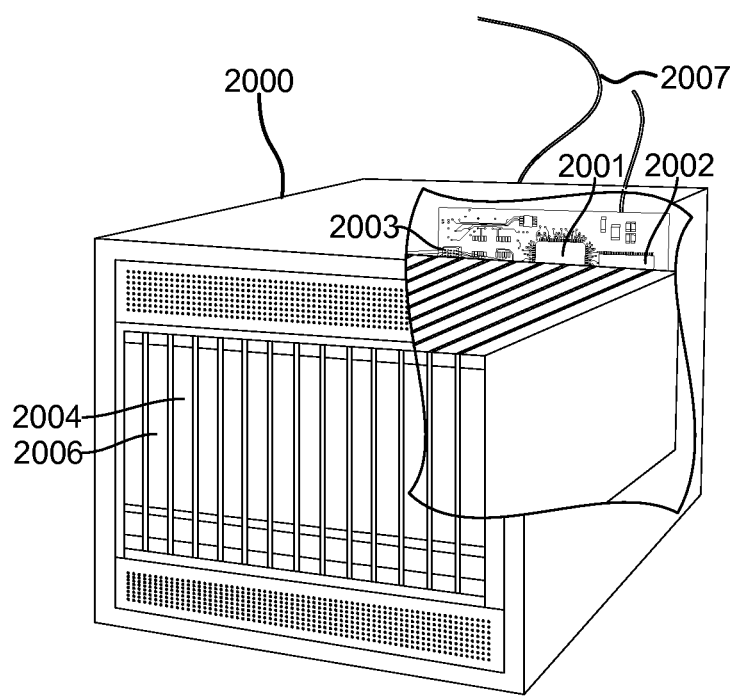
FIG. 20 is a component diagram of an example server suitable for use with the various embodiments.

The various embodiments may also be implemented on any of a variety of commercially available server devices, such as the server 2000 illustrated in FIG. 20. Such a server 2000 typically includes a processor 2001 coupled to volatile memory 2002 and a large capacity nonvolatile memory, such as a disk drive 2004. The server 2000 may also include a floppy disc drive, compact disc (CD) or DVD disc drive 2006 coupled to the processor 2001. The server 2000 may also include one or more network transceivers 2003, such as a network access port, coupled to the processor 2001 for establishing network interface connections with a communication network 2007, such as a local area network coupled to other announcement system computers and servers, the Internet, the public switched telephone network, and/or a cellular network (e.g., CDMA, TDMA, GSM, PCS, 3G, 4G, LTE, or any other type of cellular network).

The processors 1902 and 2001 may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory 1904, 1910, 2002, or 2004 before they are accessed and loaded into the processors 1902 and 2001. The processors 1902 and 2001 may include internal memory sufficient to store the application software instructions. In many devices the internal memory may be a volatile or nonvolatile memory, such as flash memory, or a mixture of both. For the purposes of this description, a general reference to memory refers to memory accessible by the processors 1902 and 2001 including internal memory or removable memory plugged into the device and memory within the processors 1902 and 2001 themselves.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more processor-executable or server-executable instructions or code on a non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for determining available services for a broadcast network, comprising:
   receiving an identification ("ID") of a current cell ("current cell ID") at a mobile device;
   determining whether the current cell ID is listed in an augmented coverage configuration file, wherein the augmented coverage configuration file lists cell IDs of cells in the broadcast network that overlap in coverage of a geographic area;
   determining one or more available services for the current cell and another cell operating on a different frequency carrier based on the augmented coverage configuration file when the current cell ID is listed in the augmented coverage configuration file; and
   adding the determined available services to a list of available services on the mobile device.

2. The method of claim 1, wherein the current cell ID is a cell global ID, and
   wherein the augmented coverage configuration file correlates cell global IDs and available services on a plurality of frequency carriers.

3. The method of claim 1, wherein the current cell ID is a cell global ID, the method further comprising:
   receiving a physical cell ID of a neighbor cell ("neighbor cell physical cell ID"); and
   determining whether the neighbor cell physical cell ID is listed in the augmented coverage configuration file,
   wherein determining one or more available services for the current cell and another cell operating on a different frequency carrier based on the augmented coverage configuration file when the current cell ID is listed in the augmented coverage configuration file comprises determining one or more available services for the current cell, another cell operating on a different frequency carrier, and the neighbor cell based on the augmented coverage configuration file when the current cell ID and the neighbor cell physical cell ID are listed in the augmented coverage configuration file.

4. The method of claim 3, wherein the augmented coverage configuration file correlates cell global IDs, physical cell IDs, and available services on a plurality of frequency carriers.

5. A mobile device, comprising:
   a memory; and
   a processor coupled to the memory and configured with processor-executable instructions to perform operations comprising:
   receiving an identification ("ID") of a current cell ("current cell ID");
   determining whether the current cell ID is listed in an augmented coverage configuration file, wherein the augmented coverage configuration file lists cell IDs of cells in a broadcast network that overlap in coverage of a geographic area;
   determining one or more available services for the current cell and another cell operating on a different frequency carrier based on the augmented coverage configuration file when the current cell ID is listed in the augmented coverage configuration file; and adding the determined available services to a list of available services on the mobile device.

6. The mobile device of claim 5, wherein the current cell ID is a cell global ID, and wherein the augmented coverage configuration file correlates cell global IDs and available services on a plurality of frequency carriers.

7. The mobile device of claim 5, wherein the current cell ID is a cell global ID, wherein the processor is configured with processor-executable instructions to perform operations further comprising:

receiving a physical cell ID of a neighbor cell ("neighbor cell physical cell ID"); and determining whether the neighbor cell physical cell ID is listed in the augmented coverage configuration file, and wherein the processor is configured with processor-executable instructions to perform operations such that determining one or more available services for the current cell and another cell operating on a different frequency carrier based on the augmented coverage configuration file when the current cell ID is listed in the augmented coverage configuration file comprises determining one or more available services for the current cell, another cell operating on a different frequency carrier, and the neighbor cell based on the augmented coverage configuration file when the current cell ID and the neighbor cell physical cell ID are listed in the augmented coverage configuration file.

8. The mobile device of claim 7, wherein the augmented coverage configuration file correlates cell global IDs, physical cell IDs, and available services on a plurality of frequency carriers.

9. A non-transitory processor-readable medium configured with processor-executable instructions to cause a processor of a mobile device to perform operations comprising:

receiving an identification ("ID") of a current cell ("current cell ID");

determining whether the current cell ID is listed in an augmented coverage configuration file, wherein the augmented coverage configuration file lists cell IDs of cells in a broadcast network that overlap in coverage of a geographic area;

determining one or more available services for the current cell and another cell operating on a different frequency carrier based on the augmented coverage configuration file when the current cell ID is listed in the augmented coverage configuration file; and adding the determined available services to a list of available services on the mobile device.

10. The non-transitory processor-readable medium of claim 9, wherein the processor-executable instructions are configured to cause a processor of a mobile device to perform operations such that:

the current cell ID is a cell global ID; and the augmented coverage configuration file correlates cell global IDs and available services on a plurality of frequency carriers.

11. The non-transitory processor-readable medium of claim 9, wherein the processor-executable instructions are configured to cause a processor of a mobile device to perform operations such that the current cell ID is a cell global ID, wherein the processor-executable instructions are configured to cause a processor of a mobile device to perform operations further comprising:

receiving a physical cell ID of a neighbor cell ("neighbor cell physical cell ID"); and determining whether the neighbor cell physical cell ID is listed in the augmented coverage configuration file, and wherein the processor-executable instructions are configured to cause a processor of a mobile device to perform operations such that determining one or more available services for the current cell and another cell operating on a different frequency carrier based on the augmented coverage configuration file when the current cell ID is listed in the augmented coverage configuration file comprises determining one or more available services for the current cell, another cell operating on a different frequency carrier, and the neighbor cell based on the augmented coverage configuration file when the current cell ID and the neighbor cell physical cell ID are listed in the augmented coverage configuration file.

12. The non-transitory processor-readable medium of claim 11, wherein the processor-executable instructions are configured to cause a processor of a mobile device to perform operations such that the augmented coverage configuration file correlates cell global IDs, physical cell IDs, and available services on a plurality of frequency carriers.

13. A method for determining available services for a broadcast network, comprising:

receiving an identification ("ID") of a current cell ("current cell ID") at a mobile device;

receiving a service description in the mobile device;

determining whether the current cell ID is listed in an augmented coverage configuration file, wherein the augmented coverage configuration file lists cell IDs of cells in the broadcast network that overlap in coverage of a geographic area;

determining a service area for the current cell ID based on the augmented coverage configuration file when the current cell ID is listed in the augmented coverage configuration file;

determining one or more available services for the determined service area on two different frequency carriers based on the service description; and adding the determined available services to a list of available services on the mobile device.

14. The method of claim 13, wherein:

the current cell ID is a cell global ID;

the service description is a user service description;

the augmented coverage configuration file correlates cell global IDs and service areas; and the user service description correlates service areas and available services on a plurality of frequency carriers.

15. The method of claim 13, wherein the current cell ID is a cell global ID, the method further comprising:

receiving a physical cell ID of a neighbor cell ("neighbor cell physical cell ID");

determining whether the neighbor cell physical cell ID is listed in the augmented coverage configuration file;

determining a second service area for the neighbor cell based on the augmented coverage configuration file when the neighbor cell physical ID is listed in the augmented coverage configuration file; and determining one or more additional available services on the two different frequency carriers for the determined second service area based on the service description; and adding the determined additional available services to the list of available services on the mobile device.

16. The method of claim 15, wherein:
the service description is a user service description;
the augmented coverage configuration file correlates cell global IDs, physical cell IDs, and service areas; and
the user service description correlates service areas and available services on a plurality of frequency carriers.

17. The method of claim 13, wherein the determined service area is an eMBMS service area.

18. A mobile device, comprising:
a memory; and
a processor coupled to the memory and configured with processor-executable instructions to perform operations comprising:
receiving an identification ("ID") of a current cell ("current cell ID");
receiving a service description;
determining whether the current cell ID is listed in an augmented coverage configuration file, wherein the augmented coverage configuration file lists cell IDs of cells in the broadcast network that overlap in coverage of a geographic area;
determining a service area for the current cell ID based on the augmented coverage configuration file when the current cell ID is listed in the augmented coverage configuration file;
determining one or more available services for the determined service area on two different frequency carriers based on the service description; and
adding the determined available services to a list of available services on the mobile device.

19. The mobile device of claim 18, wherein:
the current cell ID is a cell global ID;
the service description is a user service description;
the augmented coverage configuration file correlates cell global IDs and service areas; and
the user service description correlates service areas and available services on a plurality of frequency carriers.

20. The mobile device of claim 18, wherein the current cell ID is a cell global ID, and
wherein the processor is configured with processor-executable instructions to perform operations further comprising:
receiving a physical cell ID of a neighbor cell ("neighbor cell physical cell ID");
determining whether the neighbor cell physical cell ID is listed in the augmented coverage configuration file;
determining a second service area for the neighbor cell based on the augmented coverage configuration file when the neighbor cell physical ID is listed in the augmented coverage configuration file; and
determining one or more additional available services on the two different frequency carriers for the determined second service area based on the service description; and
adding the determined additional available services to the list of available services on the mobile device.

21. The mobile device of claim 20, wherein:
the service description is a user service description;
the augmented coverage configuration file correlates cell global IDs, physical cell IDs, and service areas; and
the user service description correlates service areas and available services on a plurality of frequency carriers.

22. The mobile device of claim 18, wherein the determined service area is an eMBMS service area.

23. A non-transitory processor-readable medium configured with processor-executable instructions to cause a processor of a mobile device to perform operations comprising:
receiving an identification ("ID") of a current cell ("current cell ID");
receiving a service description;
determining whether the current cell ID is listed in an augmented coverage configuration file, wherein the augmented coverage configuration file lists cell IDs of cells in the broadcast network that overlap in coverage of a geographic area;
determining a service area for the current cell ID based on the augmented coverage configuration file when the current cell ID is listed in the augmented coverage configuration file;
determining one or more available services for the determined service area on two different frequency carriers based on the service description; and
adding the determined available services to a list of available services on the mobile device.

24. The non-transitory processor-readable medium of claim 23, wherein the processor-executable instructions are configured to cause a processor of a mobile device to perform operations such that:
the current cell ID is a cell global ID;
the service description is a user service description;
the augmented coverage configuration file correlates cell global IDs and service areas; and
the user service description correlates service areas and available services on a plurality of frequency carriers.

25. The non-transitory processor-readable medium of claim 23, wherein the processor-executable instructions are configured to cause a processor of a mobile device to perform operations such that the current cell ID is a cell global ID, and
wherein the processor-executable instructions are configured to cause a processor of a mobile device to perform operations further comprising:
receiving a physical cell ID of a neighbor cell ("neighbor cell physical cell ID");
determining whether the neighbor cell physical cell ID is listed in the augmented coverage configuration file;
determining a second service area for the neighbor cell based on the augmented coverage configuration file when the neighbor cell physical ID is listed in the augmented coverage configuration file; and
determining one or more additional available services on the two different frequency carriers for the determined second service area based on the service description; and
adding the determined additional available services to the list of available services on the mobile device.

26. The non-transitory processor-readable medium of claim 25, wherein the processor-executable instructions are configured to cause a processor of a mobile device to perform operations such that:
the service description is a user service description;
the augmented coverage configuration file correlates cell global IDs, physical cell IDs, and service areas; and
the user service description correlates service areas and available services on a plurality of frequency carriers.

27. The non-transitory processor-readable medium of claim 23, wherein the processor-executable instructions are configured to cause a processor of a mobile device to perform operations such that the determined service area is an eMBMS service area.

* * * * *